United States Patent
Christiansson et al.

(10) Patent No.: US 10,481,737 B2
(45) Date of Patent: Nov. 19, 2019

(54) PEN DIFFERENTIATION FOR TOUCH DISPLAY

(71) Applicant: FlatFrog Laboratories AB, Lund (SE)

(72) Inventors: Tomas Christiansson, Torna-Hällestad (SE); Kristofer Jakobson, Malmö (SE)

(73) Assignee: FlatFrog Laboratories AB, Lund (SE)

(*) Notice: Subject to any disclaimer, the term of this patent is extended or adjusted under 35 U.S.C. 154(b) by 58 days.

(21) Appl. No.: 15/925,333

(22) Filed: Mar. 19, 2018

(65) Prior Publication Data

US 2018/0275831 A1   Sep. 27, 2018

(30) Foreign Application Priority Data

Mar. 22, 2017  (SE) ......... 1730073
Apr. 28, 2017  (SE) ......... 1730120
May 24, 2017  (EP) ......... 17172910
Oct. 5, 2017   (SE) ......... 1730276

(51) Int. Cl.
*G06F 3/042* (2006.01)

(52) U.S. Cl.
CPC ........... *G06F 3/0421* (2013.01); *G06F 3/042* (2013.01); *G06F 2203/04106* (2013.01); *G06F 2203/04109* (2013.01)

(58) Field of Classification Search
None
See application file for complete search history.

(56) References Cited

U.S. PATENT DOCUMENTS

| | | |
|---|---|---|
| 3,440,426 A | 4/1969 | Bush |
| 3,553,680 A | 1/1971 | Cooreman |
| 3,673,327 A | 6/1972 | Johnson et al. |
| 4,129,384 A | 12/1978 | Walker et al. |
| 4,180,702 A | 12/1979 | Sick et al. |
| 4,209,255 A | 6/1980 | Heynau et al. |

(Continued)

FOREIGN PATENT DOCUMENTS

| | | |
|---|---|---|
| CN | 201233592 Y | 5/2009 |
| CN | 101644854 A | 2/2010 |

(Continued)

OTHER PUBLICATIONS

Ahn, Y., et al., "A slim and wide multi-touch tabletop interface and its applications," BigComp2014, IEEE, 2014, in 6 pages.

(Continued)

*Primary Examiner* — Nicholas J Lee
(74) *Attorney, Agent, or Firm* — Knobbe Martens Olson & Bear, LLP

(57) ABSTRACT

An optical IR touch sensing apparatus can determine, based on output signals of light detectors, a light energy value for each light path across a touch surface, and generate a transmission value for each light path based on the light energy value. A processor can operate an image reconstruction algorithm on at least part of the thus-generated transmission values and determine a position of a touching object on the touch surface, an attenuation value corresponding to the attenuation of the light resulting from the object touching the touch surface, and an occlusion compensation value for compensating the occlusion affect from other objects on the touch surface. Using these values, the processor can identify the type of object.

17 Claims, 13 Drawing Sheets

(56) References Cited

U.S. PATENT DOCUMENTS

| | | |
|---|---|---|
| 4,213,707 A | 7/1980 | Evans, Jr. |
| 4,254,333 A | 3/1981 | Bergström |
| 4,254,407 A | 3/1981 | Tipon |
| 4,294,543 A | 10/1981 | Apple et al. |
| 4,346,376 A | 8/1982 | Mallos |
| 4,420,261 A | 12/1983 | Barlow et al. |
| 4,484,179 A | 11/1984 | Kasday |
| 4,507,557 A | 3/1985 | Tsikos |
| 4,521,112 A | 6/1985 | Kuwabara et al. |
| 4,542,375 A | 9/1985 | Alles et al. |
| 4,550,250 A | 10/1985 | Mueller et al. |
| 4,593,191 A | 6/1986 | Alles |
| 4,673,918 A | 6/1987 | Adler et al. |
| 4,688,933 A | 8/1987 | Lapeyre |
| 4,688,993 A | 8/1987 | Ferris et al. |
| 4,692,809 A | 9/1987 | Beining et al. |
| 4,710,760 A | 12/1987 | Kasday |
| 4,736,191 A | 4/1988 | Matzke et al. |
| 4,737,626 A | 4/1988 | Hasegawa |
| 4,746,770 A | 5/1988 | McAvinney |
| 4,752,655 A | 6/1988 | Tajiri et al. |
| 4,772,763 A | 9/1988 | Garwin et al. |
| 4,782,328 A | 11/1988 | Denlinger |
| 4,812,833 A | 3/1989 | Shimauchi |
| 4,837,430 A | 6/1989 | Hasegawa |
| 4,868,912 A | 9/1989 | Doering |
| 4,891,829 A | 1/1990 | Deckman et al. |
| 4,933,544 A | 6/1990 | Tamaru |
| 4,949,079 A | 8/1990 | Loebner |
| 4,986,662 A | 1/1991 | Bures |
| 4,988,983 A | 1/1991 | Wehrer |
| 5,065,185 A | 11/1991 | Powers et al. |
| 5,073,770 A | 12/1991 | Lowbner |
| 5,105,186 A | 4/1992 | May |
| 5,159,322 A | 10/1992 | Loebner |
| 5,166,668 A | 11/1992 | Aoyagi |
| 5,227,622 A | 7/1993 | Suzuki |
| 5,248,856 A | 9/1993 | Mallicoat |
| 5,254,407 A | 10/1993 | Sergerie et al. |
| 5,345,490 A | 9/1994 | Finnigan et al. |
| 5,383,022 A | 1/1995 | Kaser |
| 5,483,261 A | 1/1996 | Yasutake |
| 5,484,966 A | 1/1996 | Segen |
| 5,499,098 A | 3/1996 | Ogawa |
| 5,502,568 A | 3/1996 | Ogawa et al. |
| 5,525,764 A | 6/1996 | Junkins et al. |
| 5,526,422 A | 6/1996 | Keen |
| 5,570,181 A | 10/1996 | Yasuo et al. |
| 5,572,251 A | 11/1996 | Ogawa |
| 5,577,501 A | 11/1996 | Flohr et al. |
| 5,600,105 A | 2/1997 | Fukuzaki et al. |
| 5,672,852 A | 9/1997 | Fukuzaki et al. |
| 5,679,930 A | 10/1997 | Katsurahira |
| 5,686,942 A | 11/1997 | Ball |
| 5,688,933 A | 11/1997 | Evans et al. |
| 5,729,249 A | 3/1998 | Yasutake |
| 5,736,686 A | 4/1998 | Perret, Jr. et al. |
| 5,740,224 A | 4/1998 | Müller et al. |
| 5,764,223 A | 6/1998 | Chang et al. |
| 5,767,517 A | 6/1998 | Hawkins |
| 5,775,792 A | 7/1998 | Wiese |
| 5,945,980 A | 8/1999 | Moissev et al. |
| 5,945,981 A | 8/1999 | Paull et al. |
| 5,959,617 A | 9/1999 | Bird et al. |
| 6,061,177 A | 5/2000 | Fujimoto |
| 6,067,079 A | 5/2000 | Shieh |
| 6,122,394 A | 9/2000 | Neukermans et al. |
| 6,141,104 A | 10/2000 | Schulz et al. |
| 6,172,667 B1 | 1/2001 | Sayag |
| 6,227,667 B1 | 5/2001 | Halldorsson et al. |
| 6,229,529 B1 | 5/2001 | Yano et al. |
| 6,333,735 B1 | 12/2001 | Anvekar |
| 6,366,276 B1 | 4/2002 | Kunimatsu et al. |
| 6,380,732 B1 | 4/2002 | Gilboa |
| 6,380,740 B1 | 4/2002 | Laub |
| 6,390,370 B1 | 5/2002 | Plesko |
| 6,429,857 B1 | 8/2002 | Masters et al. |
| 6,452,996 B1 | 9/2002 | Hsieh |
| 6,476,797 B1 | 11/2002 | Kurihara et al. |
| 6,492,633 B2 | 12/2002 | Nakazawa et al. |
| 6,495,832 B1 | 12/2002 | Kirby |
| 6,504,143 B2 | 1/2003 | Koops et al. |
| 6,529,327 B1 | 3/2003 | Graindorge |
| 6,538,644 B1 | 3/2003 | Muraoka |
| 6,587,099 B2 | 7/2003 | Takekawa |
| 6,648,485 B1 | 11/2003 | Colgan et al. |
| 6,660,964 B1 | 12/2003 | Benderly |
| 6,664,498 B2 | 12/2003 | Forsman et al. |
| 6,664,952 B2 | 12/2003 | Iwamoto et al. |
| 6,690,363 B2 | 2/2004 | Newton |
| 6,707,027 B2 | 3/2004 | Liess et al. |
| 6,738,051 B2 | 5/2004 | Boyd et al. |
| 6,748,098 B1 | 6/2004 | Rosenfeld |
| 6,784,948 B2 | 8/2004 | Kawashima et al. |
| 6,799,141 B1 | 9/2004 | Stoustrup et al. |
| 6,806,871 B1 | 10/2004 | Yasue |
| 6,927,384 B2 | 8/2005 | Reime et al. |
| 6,940,286 B2 | 9/2005 | Wang et al. |
| 6,965,836 B2 | 11/2005 | Richardson |
| 6,972,753 B1 | 12/2005 | Kimura et al. |
| 6,985,137 B2 | 1/2006 | Kaikuranta |
| 7,042,444 B2 | 5/2006 | Cok |
| 7,084,859 B1 | 8/2006 | Pryor |
| 7,133,031 B2 | 11/2006 | Wang et al. |
| 7,176,904 B2 | 2/2007 | Satoh |
| 7,359,041 B2 | 4/2008 | Xie et al. |
| 7,397,418 B1 | 7/2008 | Doerry et al. |
| 7,432,893 B2 | 10/2008 | Ma et al. |
| 7,435,940 B2 | 10/2008 | Eliasson et al. |
| 7,442,914 B2 | 10/2008 | Eliasson et al. |
| 7,465,914 B2 | 12/2008 | Eliasson et al. |
| 7,613,375 B2 | 11/2009 | Shimizu |
| 7,629,968 B2 | 12/2009 | Miller et al. |
| 7,646,833 B1 | 1/2010 | He et al. |
| 7,653,883 B2 | 1/2010 | Hotelling et al. |
| 7,655,901 B2 | 2/2010 | Idzik et al. |
| 7,705,835 B2 | 4/2010 | Eikman |
| 7,847,789 B2 | 12/2010 | Kolmykov-Zotov et al. |
| 7,855,716 B2 | 12/2010 | McCreary et al. |
| 7,859,519 B2 | 12/2010 | Tulbert |
| 7,924,272 B2 | 4/2011 | Boer et al. |
| 7,932,899 B2 | 4/2011 | Newton et al. |
| 7,969,410 B2 | 6/2011 | Kakarala |
| 7,995,039 B2 | 8/2011 | Eliasson et al. |
| 8,013,845 B2 | 9/2011 | Ostergaard et al. |
| 8,031,186 B2 | 10/2011 | Ostergaard |
| 8,077,147 B2 | 12/2011 | Krah et al. |
| 8,093,545 B2 | 1/2012 | Leong et al. |
| 8,094,136 B2 | 1/2012 | Eliasson et al. |
| 8,094,910 B2 | 1/2012 | Xu |
| 8,149,211 B2 | 4/2012 | Hayakawa et al. |
| 8,218,154 B2 | 7/2012 | Østergaard et al. |
| 8,274,495 B2 | 9/2012 | Lee |
| 8,325,158 B2 | 12/2012 | Yatsuda et al. |
| 8,339,379 B2 | 12/2012 | Goertz et al. |
| 8,350,827 B2 | 1/2013 | Chung et al. |
| 8,384,010 B2 | 2/2013 | Hong et al. |
| 8,407,606 B1 | 3/2013 | Davidson et al. |
| 8,441,467 B2 | 5/2013 | Han |
| 8,445,834 B2 | 5/2013 | Hong et al. |
| 8,466,901 B2 | 6/2013 | Yen et al. |
| 8,482,547 B2 | 7/2013 | Cobon et al. |
| 8,542,217 B2 | 9/2013 | Wassvik et al. |
| 8,567,257 B2 | 10/2013 | Van Steenberge et al. |
| 8,581,884 B2 | 11/2013 | Fåhraeus et al. |
| 8,624,858 B2 | 1/2014 | Fyke et al. |
| 8,686,974 B2 | 4/2014 | Christiansson et al. |
| 8,692,807 B2 | 4/2014 | Fahraeus et al. |
| 8,716,614 B2 | 5/2014 | Wassvik |
| 8,727,581 B2 | 5/2014 | Saccomanno |
| 8,745,514 B1 | 6/2014 | Davidson |
| 8,780,066 B2 | 7/2014 | Christiansson et al. |
| 8,830,181 B1 | 9/2014 | Clark et al. |
| 8,860,696 B2 | 10/2014 | Wassvik et al. |

(56) References Cited

U.S. PATENT DOCUMENTS

| | | |
|---|---|---|
| 8,872,098 B2 | 10/2014 | Bergström et al. |
| 8,872,801 B2 | 10/2014 | Bergström et al. |
| 8,884,900 B2 | 11/2014 | Wassvik |
| 8,890,843 B2 | 11/2014 | Wassvik et al. |
| 8,890,849 B2 | 11/2014 | Christiansson et al. |
| 8,928,590 B1 | 1/2015 | El Dokor |
| 8,963,886 B2 | 2/2015 | Wassvik |
| 8,982,084 B2 | 3/2015 | Christiansson et al. |
| 9,024,916 B2 | 5/2015 | Christiansson |
| 9,035,909 B2 | 5/2015 | Christiansson |
| 9,063,617 B2 | 6/2015 | Eliasson et al. |
| 9,086,763 B2 | 7/2015 | Johansson et al. |
| 9,134,854 B2 | 9/2015 | Wassvik et al. |
| 9,158,401 B2 | 10/2015 | Christiansson |
| 9,158,415 B2 | 10/2015 | Song et al. |
| 9,213,445 B2 | 12/2015 | King et al. |
| 9,274,645 B2 | 3/2016 | Christiansson et al. |
| 9,317,168 B2 | 4/2016 | Christiansson et al. |
| 9,323,396 B2 | 4/2016 | Han et al. |
| 9,366,565 B2 | 6/2016 | Uvnäs |
| 9,377,884 B2 | 6/2016 | Christiansson et al. |
| 9,389,732 B2 | 7/2016 | Craven-Bartle |
| 9,411,444 B2 | 8/2016 | Christiansson et al. |
| 9,411,464 B2 | 8/2016 | Wallander et al. |
| 9,430,079 B2 | 8/2016 | Christiansson et al. |
| 9,442,574 B2 | 9/2016 | Fåhraeus et al. |
| 9,547,393 B2 | 1/2017 | Christiansson et al. |
| 9,552,103 B2 | 1/2017 | Craven-Bartle et al. |
| 9,557,846 B2 | 1/2017 | Baharav et al. |
| 9,588,619 B2 | 3/2017 | Christiansson et al. |
| 9,594,467 B2 | 3/2017 | Christiansson et al. |
| 9,626,018 B2 | 4/2017 | Christiansson et al. |
| 9,626,040 B2 | 4/2017 | Wallander et al. |
| 9,639,210 B2 | 5/2017 | Wallander et al. |
| 9,678,602 B2 | 6/2017 | Wallander |
| 9,684,414 B2 | 6/2017 | Christiansson et al. |
| 9,710,101 B2 | 7/2017 | Christiansson et al. |
| 2001/0002694 A1 | 6/2001 | Nakazawa et al. |
| 2001/0005004 A1 | 6/2001 | Shiratsuki et al. |
| 2001/0005308 A1 | 6/2001 | Oishi et al. |
| 2001/0030642 A1 | 10/2001 | Sullivan et al. |
| 2002/0067348 A1 | 6/2002 | Masters et al. |
| 2002/0075243 A1 | 6/2002 | Newton |
| 2002/0118177 A1 | 8/2002 | Newton |
| 2002/0158823 A1 | 10/2002 | Zavracky et al. |
| 2002/0158853 A1 | 10/2002 | Sugawara et al. |
| 2002/0163505 A1 | 11/2002 | Takekawa |
| 2003/0016450 A1 | 1/2003 | Bluemel et al. |
| 2003/0034439 A1 | 2/2003 | Reime et al. |
| 2003/0034935 A1 | 2/2003 | Amanai et al. |
| 2003/0048257 A1 | 3/2003 | Mattila |
| 2003/0052257 A1 | 3/2003 | Sumriddetchkajorn |
| 2003/0095399 A1 | 5/2003 | Grenda et al. |
| 2003/0107748 A1 | 6/2003 | Lee |
| 2003/0137494 A1 | 7/2003 | Tulbert |
| 2003/0156100 A1 | 8/2003 | Gettemy |
| 2003/0160155 A1 | 8/2003 | Liess |
| 2003/0210537 A1 | 11/2003 | Engelmann |
| 2003/0214486 A1 | 11/2003 | Roberts |
| 2004/0027339 A1 | 2/2004 | Schulz |
| 2004/0032401 A1 | 2/2004 | Nakazawa et al. |
| 2004/0090432 A1 | 5/2004 | Takahashi et al. |
| 2004/0130338 A1 | 7/2004 | Wang et al. |
| 2004/0174541 A1 | 9/2004 | Freifeld |
| 2004/0201579 A1 | 10/2004 | Graham |
| 2004/0212603 A1 | 10/2004 | Cok |
| 2004/0238627 A1 | 12/2004 | Silverbrook et al. |
| 2004/0239702 A1 | 12/2004 | Kang et al. |
| 2004/0245438 A1 | 12/2004 | Payne et al. |
| 2004/0252091 A1 | 12/2004 | Ma et al. |
| 2004/0252867 A1 | 12/2004 | Lan et al. |
| 2005/0012714 A1 | 1/2005 | Russo et al. |
| 2005/0041013 A1 | 2/2005 | Tanaka |
| 2005/0057903 A1 | 3/2005 | Choi |
| 2005/0073508 A1 | 4/2005 | Pittel et al. |
| 2005/0083293 A1 | 4/2005 | Dixon |
| 2005/0128190 A1 | 6/2005 | Ryynanen |
| 2005/0143923 A1 | 6/2005 | Keers et al. |
| 2005/0156914 A1 | 7/2005 | Lipman et al. |
| 2005/0162398 A1 | 7/2005 | Eliasson et al. |
| 2005/0179977 A1 | 8/2005 | Chui et al. |
| 2005/0200613 A1 | 9/2005 | Kobayashi et al. |
| 2005/0212774 A1 | 9/2005 | Ho et al. |
| 2005/0248540 A1 | 11/2005 | Newton |
| 2005/0253834 A1 | 11/2005 | Sakamaki et al. |
| 2005/0276053 A1 | 12/2005 | Nortrup et al. |
| 2006/0001650 A1 | 1/2006 | Robbins et al. |
| 2006/0001653 A1 | 1/2006 | Smits |
| 2006/0007185 A1 | 1/2006 | Kobayashi |
| 2006/0008164 A1 | 1/2006 | Wu et al. |
| 2006/0017706 A1 | 1/2006 | Cutherell et al. |
| 2006/0017709 A1 | 1/2006 | Okano |
| 2006/0033725 A1 | 2/2006 | Marggraff et al. |
| 2006/0038698 A1 | 2/2006 | Chen |
| 2006/0061861 A1 | 3/2006 | Munro et al. |
| 2006/0114237 A1 | 6/2006 | Crockett et al. |
| 2006/0132454 A1 | 6/2006 | Chen et al. |
| 2006/0139340 A1 | 6/2006 | Geaghan |
| 2006/0158437 A1 | 7/2006 | Blythe et al. |
| 2006/0170658 A1 | 8/2006 | Nakamura et al. |
| 2006/0202974 A1 | 9/2006 | Thielman |
| 2006/0227120 A1 | 10/2006 | Eikman |
| 2006/0255248 A1 | 11/2006 | Eliasson |
| 2006/0256092 A1 | 11/2006 | Lee |
| 2006/0279558 A1 | 12/2006 | Van Delden et al. |
| 2006/0281543 A1 | 12/2006 | Sutton et al. |
| 2006/0290684 A1 | 12/2006 | Giraldo et al. |
| 2007/0014486 A1 | 1/2007 | Schiwietz et al. |
| 2007/0024598 A1 | 2/2007 | Miller et al. |
| 2007/0034783 A1 | 2/2007 | Eliasson et al. |
| 2007/0038691 A1 | 2/2007 | Candes et al. |
| 2007/0052684 A1 | 3/2007 | Gruhlke et al. |
| 2007/0070056 A1 | 3/2007 | Sato et al. |
| 2007/0075648 A1 | 4/2007 | Blythe et al. |
| 2007/0120833 A1 | 5/2007 | Yamaguchi et al. |
| 2007/0125937 A1 | 6/2007 | Eliasson et al. |
| 2007/0152985 A1 | 7/2007 | Ostergaard et al. |
| 2007/0201042 A1 | 8/2007 | Eliasson et al. |
| 2007/0296688 A1 | 12/2007 | Nakamura et al. |
| 2008/0006766 A1 | 1/2008 | Oon et al. |
| 2008/0007540 A1 | 1/2008 | Ostergaard |
| 2008/0007541 A1 | 1/2008 | Eliasson et al. |
| 2008/0007542 A1 | 1/2008 | Eliasson et al. |
| 2008/0011944 A1 | 1/2008 | Chua et al. |
| 2008/0029691 A1 | 2/2008 | Han |
| 2008/0036743 A1 | 2/2008 | Westerman et al. |
| 2008/0062150 A1 | 3/2008 | Lee |
| 2008/0068691 A1 | 3/2008 | Miyatake |
| 2008/0074401 A1 | 3/2008 | Chung et al. |
| 2008/0088603 A1 | 4/2008 | Eliasson et al. |
| 2008/0121442 A1 | 5/2008 | Boer et al. |
| 2008/0122792 A1 | 5/2008 | Izadi et al. |
| 2008/0122803 A1 | 5/2008 | Izadi et al. |
| 2008/0130979 A1 | 6/2008 | Run et al. |
| 2008/0150846 A1 | 6/2008 | Chung et al. |
| 2008/0150848 A1 | 6/2008 | Chung et al. |
| 2008/0151126 A1 | 6/2008 | Yu |
| 2008/0158176 A1 | 7/2008 | Land et al. |
| 2008/0189046 A1 | 8/2008 | Eliasson et al. |
| 2008/0192025 A1 | 8/2008 | Jaeger et al. |
| 2008/0238433 A1 | 10/2008 | Joutsenoja et al. |
| 2008/0246388 A1 | 10/2008 | Cheon et al. |
| 2008/0252619 A1 | 10/2008 | Crockett et al. |
| 2008/0266266 A1 | 10/2008 | Kent et al. |
| 2008/0278460 A1 | 11/2008 | Arnett et al. |
| 2008/0284925 A1 | 11/2008 | Han |
| 2008/0291668 A1 | 11/2008 | Aylward et al. |
| 2008/0297482 A1 | 12/2008 | Weiss |
| 2009/0002340 A1 | 1/2009 | Van Genechten |
| 2009/0006292 A1 | 1/2009 | Block |
| 2009/0040786 A1 | 2/2009 | Mori |
| 2009/0066647 A1 | 3/2009 | Kerr et al. |
| 2009/0067178 A1 | 3/2009 | Huang et al. |
| 2009/0073142 A1 | 3/2009 | Yamashita et al. |

(56) References Cited

U.S. PATENT DOCUMENTS

| | | |
|---|---|---|
| 2009/0077501 A1 | 3/2009 | Partridge et al. |
| 2009/0085894 A1 | 4/2009 | Gandhi et al. |
| 2009/0091554 A1 | 4/2009 | Keam |
| 2009/0115919 A1 | 5/2009 | Tanaka et al. |
| 2009/0122020 A1 | 5/2009 | Eliasson et al. |
| 2009/0128508 A1 | 5/2009 | Sohn et al. |
| 2009/0135162 A1 | 5/2009 | Van De Wijdeven et al. |
| 2009/0143141 A1 | 6/2009 | Wells et al. |
| 2009/0153519 A1 | 6/2009 | Suarez Rovere |
| 2009/0161026 A1 | 6/2009 | Wu et al. |
| 2009/0168459 A1 | 7/2009 | Holman et al. |
| 2009/0187842 A1 | 7/2009 | Collins et al. |
| 2009/0189857 A1 | 7/2009 | Benko et al. |
| 2009/0189874 A1 | 7/2009 | Chene et al. |
| 2009/0189878 A1 | 7/2009 | Goertz et al. |
| 2009/0219256 A1 | 9/2009 | Newton |
| 2009/0229892 A1 | 9/2009 | Fisher et al. |
| 2009/0251439 A1 | 10/2009 | Westerman et al. |
| 2009/0256817 A1 | 10/2009 | Perlin et al. |
| 2009/0259967 A1 | 10/2009 | Davidson et al. |
| 2009/0267919 A1 | 10/2009 | Chao et al. |
| 2009/0273794 A1 | 11/2009 | Østergaard et al. |
| 2009/0278816 A1 | 11/2009 | Colson |
| 2009/0297009 A1 | 12/2009 | Xu et al. |
| 2010/0033444 A1 | 2/2010 | Kobayashi |
| 2010/0045629 A1 | 2/2010 | Newton |
| 2010/0060896 A1 | 3/2010 | Van De Wijdeven et al. |
| 2010/0066016 A1 | 3/2010 | Van De Wijdeven et al. |
| 2010/0066704 A1 | 3/2010 | Kasai |
| 2010/0073318 A1 | 3/2010 | Hu et al. |
| 2010/0078545 A1 | 4/2010 | Leong et al. |
| 2010/0079407 A1 | 4/2010 | Suggs et al. |
| 2010/0079408 A1 | 4/2010 | Leong et al. |
| 2010/0097345 A1 | 4/2010 | Jang et al. |
| 2010/0097348 A1 | 4/2010 | Park et al. |
| 2010/0097353 A1 | 4/2010 | Newton |
| 2010/0125438 A1 | 5/2010 | Audet |
| 2010/0127975 A1 | 5/2010 | Jensen |
| 2010/0134435 A1 | 6/2010 | Kimura et al. |
| 2010/0142823 A1 | 6/2010 | Wang et al. |
| 2010/0187422 A1 | 7/2010 | Kothari et al. |
| 2010/0193259 A1 | 8/2010 | Wassvik |
| 2010/0229091 A1 | 9/2010 | Homma et al. |
| 2010/0238139 A1 | 9/2010 | Goertz et al. |
| 2010/0245292 A1 | 9/2010 | Wu |
| 2010/0265170 A1 | 10/2010 | Norieda |
| 2010/0277436 A1 | 11/2010 | Feng et al. |
| 2010/0283785 A1 | 11/2010 | Satulovsky |
| 2010/0284596 A1 | 11/2010 | Miao et al. |
| 2010/0289754 A1 | 11/2010 | Sleeman et al. |
| 2010/0295821 A1 | 11/2010 | Chang et al. |
| 2010/0302196 A1 | 12/2010 | Han et al. |
| 2010/0302209 A1 | 12/2010 | Large |
| 2010/0302210 A1 | 12/2010 | Han et al. |
| 2010/0302240 A1 | 12/2010 | Lettvin |
| 2010/0315379 A1 | 12/2010 | Allard et al. |
| 2010/0321328 A1 | 12/2010 | Chang et al. |
| 2010/0322550 A1 | 12/2010 | Trott |
| 2011/0043490 A1 | 2/2011 | Powell et al. |
| 2011/0049388 A1 | 3/2011 | Delaney et al. |
| 2011/0050649 A1 | 3/2011 | Newton et al. |
| 2011/0051394 A1 | 3/2011 | Bailey |
| 2011/0068256 A1 | 3/2011 | Hong et al. |
| 2011/0069039 A1 | 3/2011 | Lee et al. |
| 2011/0069807 A1 | 3/2011 | Dennerlein et al. |
| 2011/0074725 A1 | 3/2011 | Westerman et al. |
| 2011/0074734 A1 | 3/2011 | Wassvik et al. |
| 2011/0074735 A1 | 3/2011 | Wassvik et al. |
| 2011/0090176 A1* | 4/2011 | Christiansson ....... G06F 3/0421 345/175 |
| 2011/0102374 A1 | 5/2011 | Wassvik et al. |
| 2011/0115748 A1 | 5/2011 | Xu |
| 2011/0121323 A1 | 5/2011 | Wu et al. |
| 2011/0122075 A1 | 5/2011 | Seo et al. |
| 2011/0122091 A1 | 5/2011 | King et al. |
| 2011/0122094 A1 | 5/2011 | Tsang et al. |
| 2011/0134079 A1 | 6/2011 | Stark |
| 2011/0147569 A1 | 6/2011 | Drumm |
| 2011/0157095 A1 | 6/2011 | Drumm |
| 2011/0157096 A1 | 6/2011 | Drumm |
| 2011/0163996 A1 | 7/2011 | Wassvik et al. |
| 2011/0163997 A1 | 7/2011 | Kim |
| 2011/0163998 A1 | 7/2011 | Goertz et al. |
| 2011/0169780 A1 | 7/2011 | Goertz et al. |
| 2011/0175852 A1 | 7/2011 | Goertz et al. |
| 2011/0205186 A1 | 8/2011 | Newton et al. |
| 2011/0216042 A1 | 9/2011 | Wassvik et al. |
| 2011/0221705 A1 | 9/2011 | Yi et al. |
| 2011/0221997 A1 | 9/2011 | Kim et al. |
| 2011/0227036 A1 | 9/2011 | Vaufrey |
| 2011/0227874 A1 | 9/2011 | Fåhraeus et al. |
| 2011/0234537 A1 | 9/2011 | Kim et al. |
| 2011/0254864 A1 | 10/2011 | Tsuchikawa et al. |
| 2011/0261020 A1 | 10/2011 | Song et al. |
| 2011/0267296 A1 | 11/2011 | Noguchi et al. |
| 2011/0291989 A1 | 12/2011 | Lee |
| 2011/0298743 A1 | 12/2011 | Machida et al. |
| 2011/0309325 A1 | 12/2011 | Park et al. |
| 2011/0310045 A1 | 12/2011 | Toda et al. |
| 2012/0019448 A1 | 1/2012 | Pitkanen et al. |
| 2012/0026408 A1 | 2/2012 | Lee et al. |
| 2012/0038593 A1 | 2/2012 | Rönkä et al. |
| 2012/0062474 A1 | 3/2012 | Weishaupt et al. |
| 2012/0068973 A1 | 3/2012 | Christiansson et al. |
| 2012/0086673 A1 | 4/2012 | Chien et al. |
| 2012/0089348 A1 | 4/2012 | Perlin et al. |
| 2012/0110447 A1 | 5/2012 | Chen |
| 2012/0131490 A1 | 5/2012 | Lin et al. |
| 2012/0141001 A1 | 6/2012 | Zhang et al. |
| 2012/0146930 A1 | 6/2012 | Lee |
| 2012/0153134 A1 | 6/2012 | Bergström et al. |
| 2012/0154338 A1 | 6/2012 | Bergström et al. |
| 2012/0162142 A1 | 6/2012 | Christiansson et al. |
| 2012/0162144 A1 | 6/2012 | Fåhraeus et al. |
| 2012/0169672 A1 | 7/2012 | Christiansson |
| 2012/0181419 A1 | 7/2012 | Momtahan |
| 2012/0182266 A1 | 7/2012 | Han |
| 2012/0188206 A1 | 7/2012 | Sparf et al. |
| 2012/0191993 A1 | 7/2012 | Drader et al. |
| 2012/0200532 A1 | 8/2012 | Powell et al. |
| 2012/0200538 A1 | 8/2012 | Christiansson et al. |
| 2012/0212441 A1 | 8/2012 | Christiansson et al. |
| 2012/0217882 A1 | 8/2012 | Wong et al. |
| 2012/0249478 A1 | 10/2012 | Chang et al. |
| 2012/0256882 A1 | 10/2012 | Christiansson et al. |
| 2012/0268403 A1 | 10/2012 | Christiansson |
| 2012/0268427 A1 | 10/2012 | Slobodin |
| 2012/0274559 A1 | 11/2012 | Mathai et al. |
| 2012/0305755 A1 | 12/2012 | Hong et al. |
| 2013/0021300 A1 | 1/2013 | Wassvik |
| 2013/0021302 A1 | 1/2013 | Drumm |
| 2013/0027404 A1 | 1/2013 | Sarnoff |
| 2013/0044073 A1 | 2/2013 | Christiansson et al. |
| 2013/0055080 A1 | 2/2013 | Komer et al. |
| 2013/0076697 A1 | 3/2013 | Goertz et al. |
| 2013/0082980 A1 | 4/2013 | Gruhlke et al. |
| 2013/0107569 A1 | 5/2013 | Suganuma |
| 2013/0113715 A1 | 5/2013 | Grant et al. |
| 2013/0120320 A1 | 5/2013 | Liu et al. |
| 2013/0125016 A1 | 5/2013 | Pallakoff et al. |
| 2013/0127790 A1 | 5/2013 | Wassvik |
| 2013/0135258 A1 | 5/2013 | King et al. |
| 2013/0135259 A1 | 5/2013 | King et al. |
| 2013/0141388 A1 | 6/2013 | Ludwig et al. |
| 2013/0154983 A1 | 6/2013 | Christiansson et al. |
| 2013/0155027 A1 | 6/2013 | Holmgren et al. |
| 2013/0181896 A1 | 7/2013 | Gruhlke et al. |
| 2013/0187891 A1 | 7/2013 | Eriksson et al. |
| 2013/0201142 A1 | 8/2013 | Suarez Rovere |
| 2013/0222346 A1 | 8/2013 | Chen et al. |
| 2013/0241887 A1 | 9/2013 | Sharma |
| 2013/0249833 A1 | 9/2013 | Christiansson et al. |
| 2013/0269867 A1 | 10/2013 | Trott |
| 2013/0275082 A1 | 10/2013 | Follmer et al. |

(56) References Cited

U.S. PATENT DOCUMENTS

| | | |
|---|---|---|
| 2013/0285920 A1 | 10/2013 | Colley |
| 2013/0285968 A1 | 10/2013 | Christiansson et al. |
| 2013/0300716 A1 | 11/2013 | Craven-Bartle et al. |
| 2013/0307795 A1 | 11/2013 | Suarez Rovere |
| 2013/0342490 A1 | 12/2013 | Wallander et al. |
| 2014/0002400 A1 | 1/2014 | Christiansson et al. |
| 2014/0028575 A1 | 1/2014 | Parivar et al. |
| 2014/0028604 A1 | 1/2014 | Morinaga et al. |
| 2014/0028629 A1 | 1/2014 | Drumm et al. |
| 2014/0036203 A1 | 2/2014 | Guillou et al. |
| 2014/0055421 A1 | 2/2014 | Christiansson et al. |
| 2014/0063853 A1 | 3/2014 | Nichol et al. |
| 2014/0071653 A1 | 3/2014 | Thompson et al. |
| 2014/0085241 A1 | 3/2014 | Christiansson et al. |
| 2014/0092052 A1* | 4/2014 | Grunthaner ............ G06F 3/044 345/174 |
| 2014/0098032 A1 | 4/2014 | Ng et al. |
| 2014/0098058 A1 | 4/2014 | Baharav et al. |
| 2014/0109219 A1 | 4/2014 | Rohrweck et al. |
| 2014/0125633 A1 | 5/2014 | Fahraeus et al. |
| 2014/0160762 A1 | 6/2014 | Dudik et al. |
| 2014/0192023 A1 | 7/2014 | Hoffman |
| 2014/0232669 A1 | 8/2014 | Ohlsson et al. |
| 2014/0237401 A1 | 8/2014 | Krus et al. |
| 2014/0237408 A1 | 8/2014 | Ohlsson et al. |
| 2014/0237422 A1 | 8/2014 | Ohlsson et al. |
| 2014/0253831 A1 | 9/2014 | Craven-Bartle |
| 2014/0267124 A1 | 9/2014 | Christiansson et al. |
| 2014/0292701 A1 | 10/2014 | Christiansson et al. |
| 2014/0300572 A1 | 10/2014 | Ohlsson et al. |
| 2014/0320460 A1 | 10/2014 | Johansson et al. |
| 2014/0347325 A1 | 11/2014 | Wallander et al. |
| 2014/0362046 A1 | 12/2014 | Yoshida |
| 2014/0368471 A1 | 12/2014 | Christiansson et al. |
| 2014/0375607 A1 | 12/2014 | Christiansson et al. |
| 2015/0002386 A1 | 1/2015 | Mankowski et al. |
| 2015/0015497 A1 | 1/2015 | Leigh |
| 2015/0035774 A1 | 2/2015 | Christiansson et al. |
| 2015/0035803 A1 | 2/2015 | Wassvik et al. |
| 2015/0053850 A1 | 2/2015 | Uvnäs |
| 2015/0054759 A1 | 2/2015 | Christiansson et al. |
| 2015/0083891 A1 | 3/2015 | Wallander |
| 2015/0103013 A9 | 4/2015 | Huang |
| 2015/0130769 A1 | 5/2015 | Björklund |
| 2015/0138105 A1 | 5/2015 | Christiansson et al. |
| 2015/0138158 A1 | 5/2015 | Wallander et al. |
| 2015/0138161 A1 | 5/2015 | Wassvik |
| 2015/0205441 A1 | 7/2015 | Bergström et al. |
| 2015/0215450 A1 | 7/2015 | Seo et al. |
| 2015/0242055 A1 | 8/2015 | Wallander |
| 2015/0317036 A1 | 11/2015 | Johansson et al. |
| 2015/0324028 A1 | 11/2015 | Wassvik et al. |
| 2015/0331544 A1 | 11/2015 | Bergström et al. |
| 2015/0331545 A1 | 11/2015 | Wassvik et al. |
| 2015/0331546 A1 | 11/2015 | Craven-Bartle et al. |
| 2015/0331547 A1 | 11/2015 | Wassvik et al. |
| 2015/0332655 A1 | 11/2015 | Krus et al. |
| 2015/0346856 A1 | 12/2015 | Wassvik |
| 2015/0346911 A1* | 12/2015 | Christiansson ....... G06F 3/0421 345/175 |
| 2015/0363042 A1 | 12/2015 | Krus et al. |
| 2016/0026337 A1 | 1/2016 | Wassvik et al. |
| 2016/0034099 A1 | 2/2016 | Christiansson et al. |
| 2016/0050746 A1 | 2/2016 | Wassvik et al. |
| 2016/0070415 A1 | 3/2016 | Christiansson et al. |
| 2016/0070416 A1 | 3/2016 | Wassvik |
| 2016/0124546 A1 | 5/2016 | Chen et al. |
| 2016/0124551 A1 | 5/2016 | Christiansson et al. |
| 2016/0154531 A1 | 6/2016 | Wall |
| 2016/0202841 A1 | 7/2016 | Christiansson et al. |
| 2016/0216844 A1 | 7/2016 | Bergström |
| 2016/0224144 A1 | 8/2016 | Klinghult et al. |
| 2016/0299593 A1 | 10/2016 | Christiansson et al. |
| 2016/0328090 A1 | 11/2016 | Klinghult |
| 2016/0328091 A1 | 11/2016 | Wassvik et al. |
| 2016/0334942 A1 | 11/2016 | Wassvik |
| 2016/0342282 A1 | 11/2016 | Wassvik |
| 2016/0357348 A1 | 12/2016 | Wallander |
| 2017/0010688 A1 | 1/2017 | Fahraeus et al. |
| 2017/0090090 A1 | 3/2017 | Craven-Bartle et al. |
| 2017/0102827 A1 | 4/2017 | Christiansson et al. |
| 2017/0115235 A1 | 4/2017 | Ohlsson et al. |
| 2017/0139541 A1 | 5/2017 | Christiansson et al. |
| 2017/0177163 A1 | 6/2017 | Wallander et al. |
| 2017/0185230 A1 | 6/2017 | Wallander et al. |

FOREIGN PATENT DOCUMENTS

| | | |
|---|---|---|
| CN | 201437963 U | 4/2010 |
| CN | 101019071 B | 6/2012 |
| CN | 101206550 B | 6/2012 |
| CN | 101075168 B | 4/2014 |
| DE | 3511330 C2 | 5/1988 |
| DE | 68902419 T2 | 3/1993 |
| DE | 69000920 T2 | 6/1993 |
| DE | 19809934 A1 | 9/1999 |
| DE | 10026201 A1 | 12/2000 |
| DE | 102010000473 A1 | 8/2010 |
| EP | 0845812 B1 | 6/1998 |
| EP | 0600576 B1 | 10/1998 |
| EP | 1798630 A2 | 6/2007 |
| EP | 0897161 B1 | 10/2007 |
| EP | 2088501 A1 | 8/2009 |
| EP | 1512989 B1 | 9/2009 |
| EP | 2077490 A3 | 1/2010 |
| EP | 1126236 B1 | 12/2010 |
| EP | 2314203 A1 | 4/2011 |
| EP | 2339437 A3 | 10/2011 |
| EP | 2442180 A1 | 4/2012 |
| EP | 2466429 A1 | 6/2012 |
| EP | 2479642 A1 | 7/2012 |
| EP | 1457870 B1 | 8/2012 |
| FR | 2172828 A1 | 10/1973 |
| FR | 2617619 B1 | 1/1990 |
| FR | 2614711 B1 | 3/1992 |
| FR | 2617620 B1 | 9/1992 |
| FR | 2676275 A1 | 11/1992 |
| GB | 1380144 A | 1/1975 |
| GB | 2131544 B | 3/1986 |
| GB | 2204126 A | 11/1988 |
| JP | 2000506655 A | 5/2000 |
| JP | 2000172438 A | 6/2000 |
| JP | 2000259334 A | 9/2000 |
| JP | 2000293311 A | 10/2000 |
| JP | 2003330603 A | 11/2003 |
| JP | 2005004278 A | 1/2005 |
| JP | 2008506173 A | 2/2008 |
| JP | 2011530124 A | 12/2011 |
| KR | 100359400 | 7/2001 |
| KR | 100940435 | 2/2010 |
| WO | WO 1984/003186 A1 | 8/1984 |
| WO | WO 1999/046602 A1 | 9/1999 |
| WO | WO 01/127867 A1 | 4/2001 |
| WO | WO 01/84251 A2 | 11/2001 |
| WO | WO 02/35460 A1 | 5/2002 |
| WO | WO 02/077915 A2 | 10/2002 |
| WO | WO 02/095668 A1 | 11/2002 |
| WO | WO 03/076870 A1 | 9/2003 |
| WO | WO 2004/081502 A2 | 9/2004 |
| WO | WO 2004/081956 A2 | 9/2004 |
| WO | WO 2005/026938 A2 | 3/2005 |
| WO | WO 2005/029172 A2 | 3/2005 |
| WO | WO 2005/029395 A2 | 3/2005 |
| WO | WO 2005/125011 A1 | 12/2005 |
| WO | WO 2006/095320 A2 | 9/2006 |
| WO | WO 2006/124551 A2 | 11/2006 |
| WO | WO 2007/003196 A2 | 1/2007 |
| WO | WO 2007/058924 A2 | 5/2007 |
| WO | WO 2007/112742 A1 | 10/2007 |
| WO | WO 2008/004103 A2 | 1/2008 |
| WO | WO 2008/007276 A2 | 1/2008 |
| WO | WO 2008/017077 A2 | 2/2008 |
| WO | WO 2008/039006 A1 | 4/2008 |
| WO | WO 2008/068607 A2 | 6/2008 |

(56) References Cited

FOREIGN PATENT DOCUMENTS

| | | |
|---|---|---|
| WO | WO 2006/124551 B1 | 7/2008 |
| WO | WO 2008/017077 A4 | 2/2009 |
| WO | WO 2009/048365 A1 | 4/2009 |
| WO | WO 2009/077962 A2 | 6/2009 |
| WO | WO 2009/102681 A2 | 8/2009 |
| WO | WO 2009/137355 A2 | 11/2009 |
| WO | WO 2010/006882 A2 | 1/2010 |
| WO | WO 2010/006883 A2 | 1/2010 |
| WO | WO 2010/006884 A2 | 1/2010 |
| WO | WO 2010/006885 A2 | 1/2010 |
| WO | WO 2010/006886 A2 | 1/2010 |
| WO | WO 2010/015408 A1 | 2/2010 |
| WO | WO 2010/046539 A1 | 4/2010 |
| WO | WO 2010/056177 A1 | 5/2010 |
| WO | WO 2010/064983 A2 | 6/2010 |
| WO | WO 2010/081702 A2 | 7/2010 |
| WO | WO 2010/112404 A1 | 10/2010 |
| WO | WO 2010/123809 A2 | 10/2010 |
| WO | WO 2010/134865 A1 | 11/2010 |
| WO | WO 2011/028169 A1 | 3/2011 |
| WO | WO 2011/028170 A1 | 3/2011 |
| WO | WO 2011/049511 A1 | 4/2011 |
| WO | WO 2011/049512 A1 | 4/2011 |
| WO | WO 2011/049513 A1 | 4/2011 |
| WO | WO 2011/057572 A1 | 5/2011 |
| WO | WO 2011/078769 A1 | 6/2011 |
| WO | WO 2011/082477 A1 | 7/2011 |
| WO | WO 2011/139213 A1 | 11/2011 |
| WO | WO 2012/002894 A1 | 1/2012 |
| WO | WO 2012/010078 A1 | 1/2012 |
| WO | WO 2012/050510 A1 | 4/2012 |
| WO | WO 2012/082055 A1 | 6/2012 |
| WO | WO 2012/105893 A1 | 8/2012 |
| WO | WO 2012/121652 A1 | 9/2012 |
| WO | WO 2012/158105 A2 | 11/2012 |
| WO | WO 2012/172302 A1 | 12/2012 |
| WO | WO 2012/176801 A1 | 12/2012 |
| WO | WO 2013/036192 A1 | 3/2013 |
| WO | WO 2013/048312 A2 | 4/2013 |
| WO | WO 2013/055282 A2 | 4/2013 |
| WO | WO 2013/062471 A2 | 5/2013 |
| WO | WO 2013/089622 A2 | 6/2013 |
| WO | WO 2013/133756 A1 | 9/2013 |
| WO | WO 2013/133757 A2 | 9/2013 |
| WO | WO 2013/176613 A2 | 11/2013 |
| WO | WO 2013/176614 A2 | 11/2013 |
| WO | WO 2013/176615 A2 | 11/2013 |
| WO | WO 2014/055809 A1 | 4/2014 |

OTHER PUBLICATIONS

Chou, N., et al., "Generalized pseudo-polar Fourier grids and applications in regfersting optical coherence tomography images," 43rd Asilomar Conference on Signals, Systems and Computers, Nov. 2009, in 5 pages.

Fihn, M., "Touch Panel—Special Edition," Veritas et Visus, Nov. 2011, in 1 page.

Fourmont, K., "Non-Equispaced Fast Fourier Transforms with Applications to Tomography," Journal of Fourier Analysis and Applications, vol. 9, Issue 5, 2003, in 20 pages.

Iizuka, K., "Boundaries, Near-Field Optics, and Near-Field Imaging," Elements of Photonics, vol. 1: In Free Space and Special Media, Wiley & Sons, 2002, in 57 pages.

Johnson, M., "Enhanced Optical Touch Input Panel", IBM Technical Disclousre Bulletin, 1985, in 3 pages.

Kak, et al., "Principles of Computerized Tomographic Imaging", Institute of Electrical Engineers, Inc., 1999, in 333 pages.

The Laser Wall, MIT, 1997, http://web.media.mit.edu/~joep/SpectrumWeb/captions/Laser.html.

Liu, J., et al. "Multiple touch points identifying method, involves starting touch screen, driving specific emission tube, and computing and transmitting coordinate of touch points to computer system by direct lines through interface of touch screen," 2007, in 25 pages.

Natterer, F., "The Mathematics of Computerized Tomography", Society for Industrial and Applied Mathematics, 2001, in 240 pages.

Natterer, F., et al. "Fourier Reconstruction," Mathematical Methods in Image Reconstruction, Society for Industrial and Applied Mathematics, 2001, in 12 pages.

Paradiso, J.A., "Several Sensor Approaches that Retrofit Large Surfaces for Interactivity," ACM Ubicomp 2002 Workshop on Collaboration with Interactive Walls and Tables, 2002, in 8 pages.

Tedaldi, M., et al. "Refractive index mapping of layered samples using optical coherence refractometry," Proceedings of SPIE, vol. 7171, 2009, in 8 pages.

* cited by examiner

PEN DIFFERENTIATION FOR TOUCH DISPLAY

INCORPORATION BY REFERENCE TO ANY PRIORITY APPLICATIONS

Any and all applications for which a foreign or domestic priority claim is identified in the Application Data Sheet as filed with the present application are hereby incorporated by reference under 37 CFR 1.57.

BACKGROUND OF THE INVENTION

Field of the Invention

The present disclosure relates to techniques for detecting and identifying objects on a touch surface.

Description of the Related Art

To an increasing extent, touch-sensitive panels are being used for providing input data to computers, electronic measurement and test equipment, gaming devices, etc. The panel may be provided with a graphical user interface (GUI) for a user to interact with using e.g. a pointer, stylus or one or more fingers. The GUI may be fixed or dynamic. A fixed GUI may e.g. be in the form of printed matter placed over, under or inside the panel. A dynamic GUI can be provided by a display screen integrated with, or placed underneath, the panel or by an image being projected onto the panel by a projector.

There are numerous known techniques for providing touch sensitivity to the panel, e.g. by using cameras to capture light scattered off the point(s) of touch on the panel, by using cameras to directly observe the objects interacting with the panel, by incorporating resistive wire grids, capacitive sensors, strain gauges, etc. into the panel.

In one category of touch-sensitive panels known as 'above surface optical touch systems' and known from e.g. U.S. Pat. No. 4,459,476, a plurality of optical emitters and optical receivers are arranged around the periphery of a touch surface to create a grid of intersecting light paths above the touch surface. Each light path extends between a respective emitter/receiver pair. An object that touches the touch surface will block or attenuate some of the light paths. Based on the identity of the receivers detecting a blocked light path, a processor can determine the location of the intercept between the blocked light paths.

For most touch systems, a user may place a finger onto the surface of a touch panel in order to register a touch. Alternatively, a stylus may be used. A stylus is typically a pen shaped object with one end configured to be pressed against the surface of the touch panel. An example of a stylus according to the prior art is shown in FIG. 2. Use of a stylus 60 may provide improved selection accuracy and pointer precision over a simple finger touch. This can be due to the engineered stylus tip 160 providing a smaller and/or more regular contact surface with the touch panel than is possible with a human finger. Also, muscular control of an entire hand in a pen holding position can be more precise than a single finger for the purposes of pointer control due to lifelong training in the use of pens and pencils.

PCT/SE2016/051229 describes an optical IR touch sensing apparatus configured to determine a position of a touching object on the touch surface and an attenuation value corresponding to the attenuation of the light resulting from the object touching the touch surface. Using these values, the apparatus can differentiate between different types of objects, including multiple stylus tips, fingers, palms. The differentiation between the object types may be determined by a function that takes into account how the attenuation of a touching object varies across the touch surface, compensating for e.g. light field height, detection line density, detection line angular density etc. However, the determination of an object in this way becomes more difficult when other touching objects are close by, since they occlude a lot of detection lines (otherwise known as scanlines) passing through both the occluding objects and the object to be determined.

Therefore, what is needed is a way of improving the identification of objects touching an optical touch system that mitigates the above problem.

SUMMARY OF THE INVENTION

It is an objective of the disclosure to at least partly overcome one or more of the above-identified limitations of the prior art.

One or more of these objectives, as well as further objectives that may appear from the description below, are at least partly achieved by means of a method for data processing, a computer readable medium, devices for data processing, and a touch-sensing apparatus according to the independent claims, embodiments thereof being defined by the dependent claims.

An embodiment provides a touch sensing apparatus, comprising: a touch surface, a plurality of emitters arranged around the periphery of the touch surface to emit beams of light such that one or more objects touching the touch surface cause an attenuation of the light; a plurality of light detectors arranged around the periphery of the touch surface to receive light from the plurality of emitters on a plurality of light paths, wherein each light detector is arranged to receive light from more than one emitter; and a processing element configured to: determine, based on output signals of the light detectors, a light energy value for each light path; generate a transmission value for each light path based on the light energy value; operate an image reconstruction algorithm on at least part of the thus-generated transmission values so as to determine, for each object; a position of the object on the touch surface, and an attenuation value corresponding to the attenuation of the light resulting from the object touching the touch surface, an occlusion compensation value indicative of the occlusion, by other objects on the touch surface, of light paths intersecting with the object, determine an object type of the object in dependence on the attenuation value and occlusion compensation value.

Another embodiment provides a method of determining a type of object in contact with a touch surface of a touch sensing apparatus, said touch sensing apparatus can include: a touch surface, a plurality of emitters arranged around the periphery of the touch surface to emit beams of light such that one or more objects touching the touch surface cause an attenuation of the light; a plurality of light detectors arranged around the periphery of the touch surface to receive light from the plurality of emitters on a plurality of light paths, wherein each light detector is arranged to receive light from more than one emitter; and said method comprising the steps of: determining, based on output signals of the light detectors, a light energy value for each light path; generating a transmission value for each light path based on the light energy value; operating an image reconstruction algorithm on at least part of the thus-generated transmission values so as to determine, for each object; a position of the object on the touch surface, and an attenuation value corresponding to the attenuation of the light resulting from the object touching the touch surface, an occlusion compensation value indicative of the occlusion, by other objects on the touch surface, of light paths intersecting with the object; determining an object type of the object in dependence on the attenuation value and occlusion compensation value.

BRIEF DESCRIPTION OF THE DRAWINGS

Embodiments of the invention will now be described in more detail with reference to the accompanying schematic drawings.

DETAILED DESCRIPTION OF THE EMBODIMENT

Figure 1:
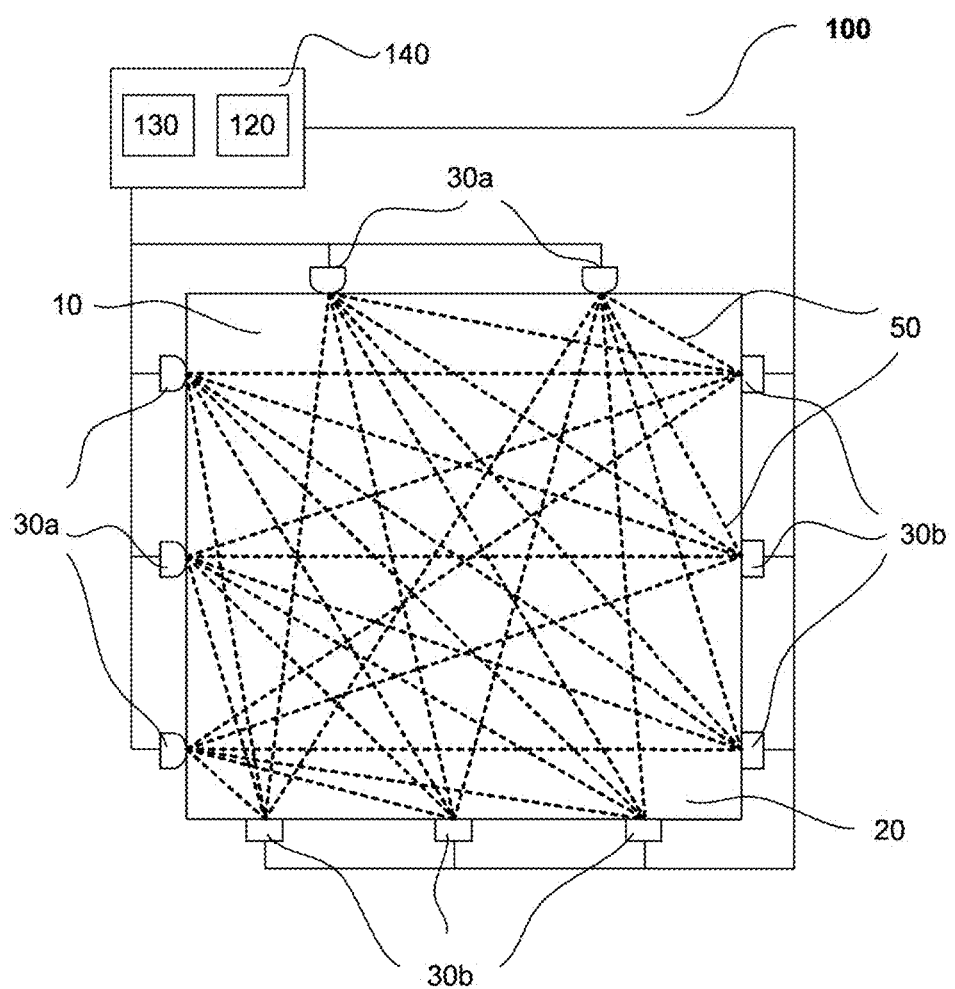
FIG. 1 is a top plan view of an optical touch apparatus.

The present disclosure relates to optical touch panels and the use of techniques for providing touch sensitivity to a display apparatus. Throughout the description the same reference numerals are used to identify corresponding elements.

In addition to having its ordinary meaning, the following terms can also mean:

A "touch object" or "touching object" may be a physical object that touches, or is brought in sufficient proximity to, a touch surface so as to be detected by one or more sensors in the touch system. The physical object may be animate or inanimate.

An "interaction" can occur when the touch object affects a parameter measured by the sensor.

A "touch" can denote a point of interaction as seen in the interaction pattern.

A "light field" can be the light flowing between an emitter and a corresponding detector. Although an emitter may generate a large amount of light in many directions, only the light measured by a detector from an emitter defines the light field for the emitter and detector.

Figure 2:
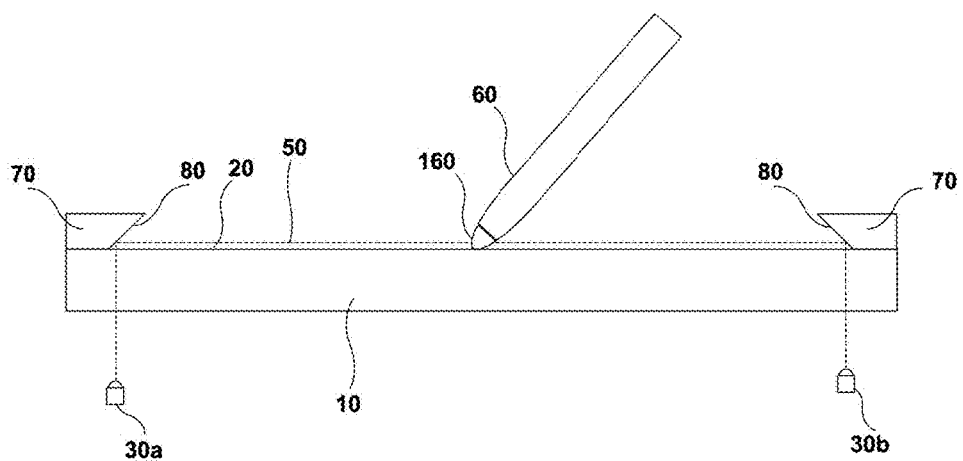
FIG. 2 shows a cross-section of an IR optical touch apparatus according to the prior art.

FIG. 1 is a top plan view of an optical touch apparatus which may correspond to the IR optical touch apparatus of FIG. 2. Emitters 30a are distributed around the periphery of touch surface 20, to project light across the touch surface 20 of touch panel 10. Detectors 30b are distributed around the periphery of touch surface 20, to receive part of the propagating light. The light from each of emitters 30a will thereby propagate to a number of different detectors 30b on a plurality of light paths 50.

FIG. 2 shows a cross-section of an IR optical touch apparatus according to the prior art. In the example apparatus shown in FIG. 2, object 60 will attenuate light propagating along at least one light path 50. In the example shown of FIG. 2, object 60 may even fully occlude the light on at least one light path 50.

Light paths 50 may conceptually be represented as "detection lines" that extend across the touch surface 20 to the periphery of touch surface 20 between pairs of emitters 30a and detectors 30b, as shown in FIG. 1. Thus, the detection lines 50 correspond to a projection of the light paths 50 onto the touch surface 20. Thereby, the emitters 30a and detectors 30b collectively define a grid of detection lines 50 ("detection grid") on the touch surface 20, as seen in a top plan view. The spacing of intersections in the detection grid defines the spatial resolution of the touch-sensitive apparatus 100, i.e. the smallest object that can be detected on the touch surface 20. The width of the detection line is a function of the width of the emitters and corresponding detectors. A wide detector detecting light from a wide emitter provides a wide detection line with a broader surface coverage, minimising the space in between detection lines which provide no touch coverage. A disadvantage of broad detection lines may be the reduced touch precision and lower signal to noise ratio.

As used herein, the emitters 30a may be any type of device capable of emitting radiation in a desired wavelength range, for example a diode laser, a VCSEL (vertical-cavity surface-emitting laser), an LED (light-emitting diode), an incandescent lamp, a halogen lamp, etc. The emitters 30a may also be formed by the end of an optical fibre. The emitters 30a may generate light in any wavelength range. The following examples presume that the light is generated in the infrared (IR), i.e. at wavelengths above about 750 nm. Analogously, the detectors 30b may be any device capable of converting light (in the same wavelength range) into an electrical signal, such as a photo-detector, a CCD device, a CMOS device, etc.

The detectors 30b collectively provide an output signal, which is received and sampled by a signal processor 130. The output signal contains a number of sub-signals, also denoted "transmission values", each representing the energy of light received by one of light detectors 30b from one of light emitters 30a. Depending on implementation, the signal processor 130 may need to process the output signal for separation of the individual transmission values. The transmission values represent the received energy, intensity or power of light received by the detectors 30*b* on the individual detection lines 50. Whenever an object touches a detection line 50, the received energy on this detection line is decreased or "attenuated". Where an object blocks the entire width of the detection line of an above-surface system, the detection line will be fully attenuated or occluded.

Figure 3:
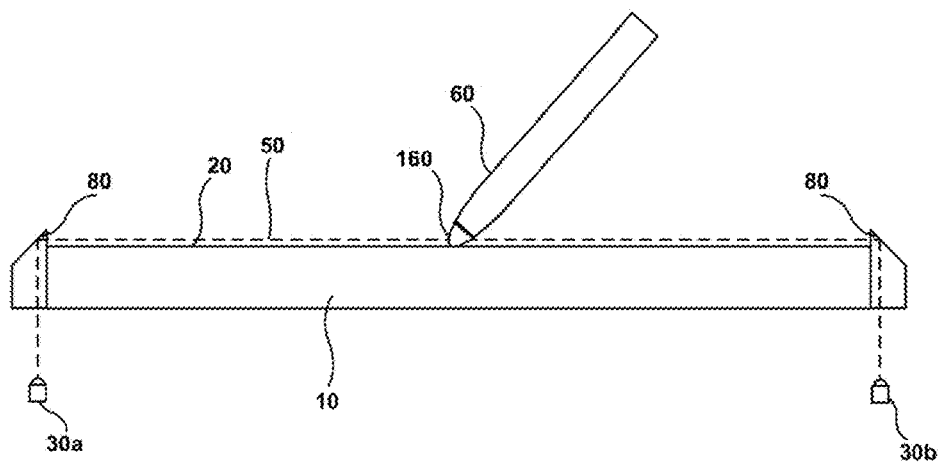
FIG. 3 shows a cross-section of another IR optical touch apparatus.

In an embodiment, the touch apparatus is arranged according to FIG. 2. A light emitted by emitters 30*a* is transmitted through transmissive panel 10 in a manner that does not cause the light to TIR within transmissive panel 10. Instead, the light exits transmissive panel 10 through touch surface 20 and is reflected by reflector surface 80 of edge reflector 70 to travel along a path 50 in a plane parallel with touch surface 20. The light will then continue until deflected by reflector surface 80 of the edge reflector 70 at an opposing edge of the transmissive panel 10, wherein the light will be deflected back down through transmissive panel 10 and onto detectors 30*b*. An object 60 (optionally having object tip 160) touching surface 20 will occlude light paths 50 that intersect with the location of the object on the surface resulting in an attenuated light signal received at detector 30*b*. In an alternative embodiment shown in FIG. 3, emitters 30*a* and detectors 30*b* are arranged beyond the periphery of the panel and light is provided to the surface of panel 10 from beyond the edges of panel 10.

Figure 4:
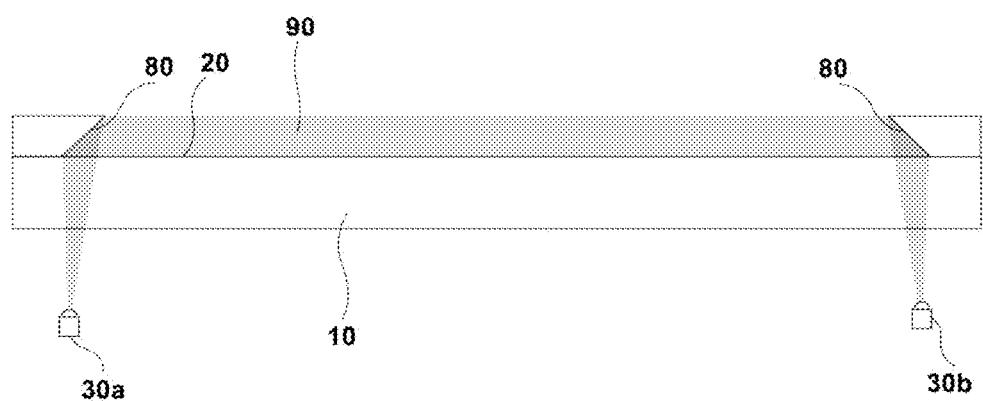
FIG. 4 shows a light field of an IR optical touch apparatus.

FIG. 4 shows the manner in which light travelling from emitters 30*a* to detectors 30*b* will form a light field 90 between reflector surfaces 80. In an embodiment, the top edge of reflector surface 80 is 2 mm above touch surface 20. This results in a light field 90 which is 2 mm deep. A 2 mm deep field is advantageous for this embodiment as it minimizes the distance that the object needs to travel into the light field to reach the touch surface and to maximally attenuate the light. The smaller the distance, the shorter time between the object entering the light field and contacting the surface. This is particularly advantageous for differentiating between large objects entering the light field slowly and small objects entering the light field quickly. A large object entering the light field will initially cause a similar attenuation as a smaller object fully extended into the light field. The shorter distance for the objects to travel, the fewer frames are required before a representative attenuation signal for each object can be observed. This effect is particularly apparent when the light field is between 0.5 mm and 2 mm deep.

Unless otherwise stated, the embodiments described in the specification apply to the arrangement shown in FIG. 2. However, some of these embodiments may also be applied to an arrangement shown in FIG. 3.

The signal processor 130 may be configured to process the transmission values so as to determine a property of the touching objects, such as a position (e.g. in a x,y coordinate system), a shape, or an area. This determination may involve a straight-forward triangulation based on the attenuated detection lines, e.g. as disclosed in U.S. Pat. No. 7,432,893 and WO2010/015408, or a more advanced processing to recreate a distribution of attenuation values (for simplicity, referred to as an "attenuation pattern") across the touch surface 20, where each attenuation value represents a local degree of light attenuation. The attenuation pattern may be further processed by the signal processor 130 or by a separate device (not shown) for determination of a position, shape or area of touching objects. The attenuation pattern may be generated e.g. by any available algorithm for image reconstruction based on transmission values, including tomographic reconstruction methods such as Filtered Back Projection, FFT-based algorithms, ART (Algebraic Reconstruction Technique), SART (Simultaneous Algebraic Reconstruction Technique), etc. Alternatively, the attenuation pattern may be generated by adapting one or more basis functions and/or by statistical methods such as Bayesian inversion. Examples of such reconstruction functions designed for use in touch determination are found in WO2009/077962, WO2011/049511, WO2011/139213, WO2012/050510, and WO2013/062471, all of which are incorporated herein by reference.

For the purposes of brevity, the term 'signal processor' is used throughout to describe one or more processing components for performing the various stages of processing required between receiving the signal from the detectors through to outputting a determination of touch including touch co-ordinates, touch properties, etc. Although the processing stages of the present disclosure may be carried out on a single processing unit (with a corresponding memory unit), the disclosure is also intended to cover multiple processing units and even remotely located processing units. In an embodiment, the signal processor 140 can include one or more hardware processors 130 and a memory 120. The hardware processors can include, for example, one or more computer processing units. The hardware processor can also include microcontrollers and/or application specific circuitry such as ASICs and FPGAs. The flowcharts and functions discussed herein can be implemented as programming instructions stored, for example, in the memory 120 or a memory of the one or more hardware processors. The programming instructions can be implemented in machine code, C, C++, JAVA, or any other suitable programming languages. The signal processor 130 can execute the programming instructions and accordingly execute the flowcharts and functions discussed herein.

Figure 5A:
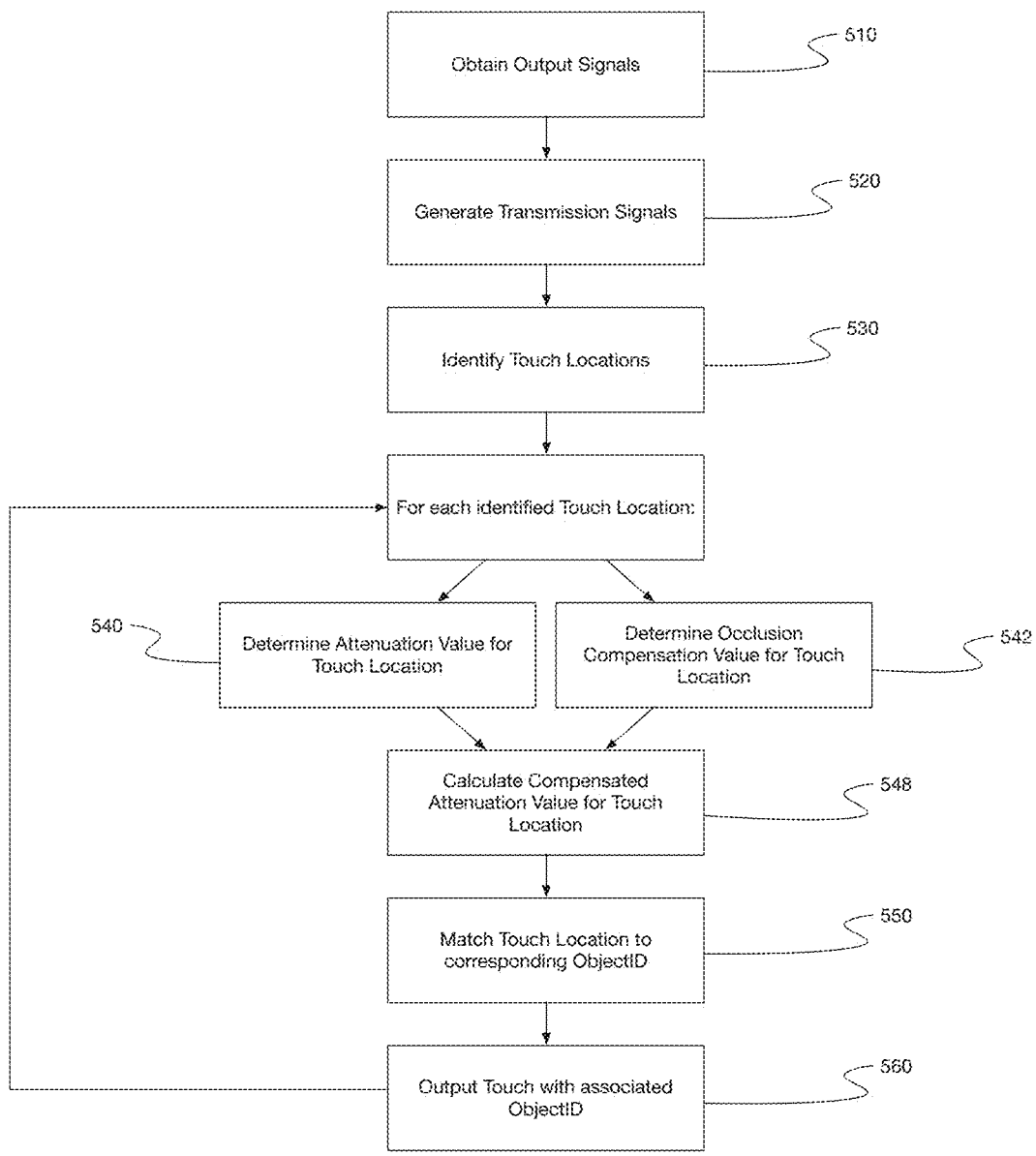
FIG. 5a is a flow chart showing a touch determination process.

FIG. 5*a* shows a flow diagram according to an embodiment.

In step 510 of FIG. 5*a*, the signal processor 130 receives and samples output signals from detectors 30*b*.

In step 520, the output signals are processed for determination of the transmission values (or 'transmission signals'). As described above, the transmission values represent the received energy, intensity or power of light received by the detectors 30*b* on the individual detection lines 50.

In step 530, the signal processor 130 is configured to process the transmission values to determine the presence of one or more touching objects on the touch surface. In an embodiment, the signal processor 130 is configured to process the transmission values to generate a two-dimensional estimation of the attenuation field across the touch surface, i.e. a spatial distribution of attenuation values, in which each touching object typically appears as a region of changed attenuation. From the attenuation field, two-dimensional touch data may be extracted and one or more touch locations may be identified. The transmission values may be processed according to a tomographic reconstruction algorithm to generate the two-dimensional estimation of the attenuation field.

In one embodiment, the signal processor 130 maybe configured to generate an attenuation field for the entire touch surface. In an alternative embodiment, the signal processor 130 maybe configured to generate an attenuation field for a sub-section of the touch surface, the sub-section being selected according to one or more criteria determined during processing of the transmission values.

In step 540, the signal processor 130 determines properties of the object at each touch location, including an attenuation value corresponding to the attenuation of the beams of light passing through the touch location resulting from the object touching the touch surface.

In one embodiment, the attenuation value is determined in the following manner: First, the attenuation pattern is processed for detection of peaks, e.g. using any known technique. In one embodiment, a global or local threshold is first applied to the attenuation pattern, to suppress noise. Any areas with attenuation values that fall above the threshold may be further processed to find local maxima. The identified maxima may be further processed for determination of a touch shape and a center position, e.g. by fitting a two-dimensional second-order polynomial or a Gaussian bell shape to the attenuation values, or by finding the ellipse of inertia of the attenuation values. There are also numerous other techniques as is well known in the art, such as clustering algorithms, edge detection algorithms, standard blob detection, water shedding techniques, flood fill techniques, etc. Step 540 results in a collection of peak data, which may include values of position, attenuation, size, and shape for each detected peak. The attenuation value may be calculated from a maximum attenuation value or a sum of attenuation values within the peak shape.

Figure 6:
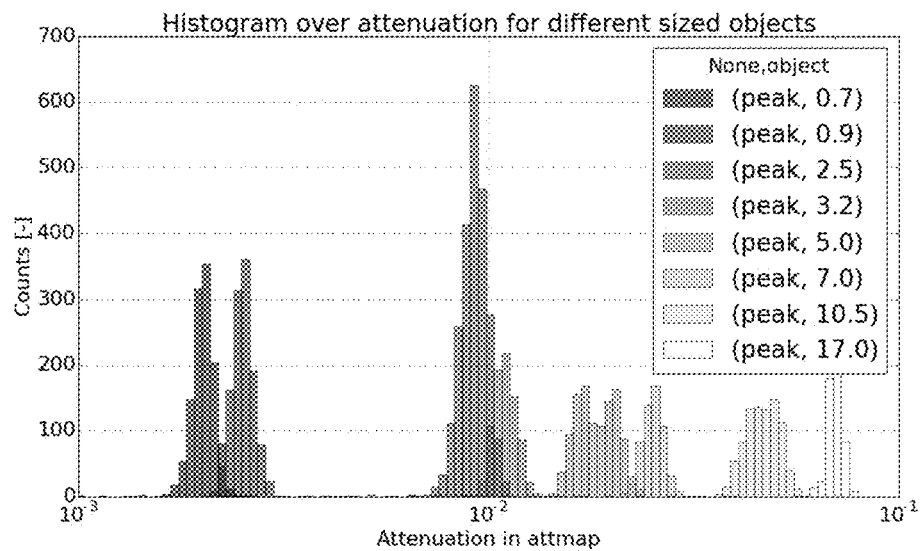
FIG. 6 is a histogram showing measured attenuation of light beams from eight unique objects applied to the touch surface.

The attenuation value recorded for an object may vary due to noise, object angle, object material, or a number of other reasons. FIG. 6 is a histogram showing a count of attenuation values for each of eight unique objects applied to the touch surface. Each object demonstrates a roughly bell-shaped distribution of frequency of recorded attenuation values. It is clear from FIG. 6 that it is possible to differentiate between different objects using recorded attenuation values, particularly where multiple attenuation values for each object are recorded.

Figure 7:
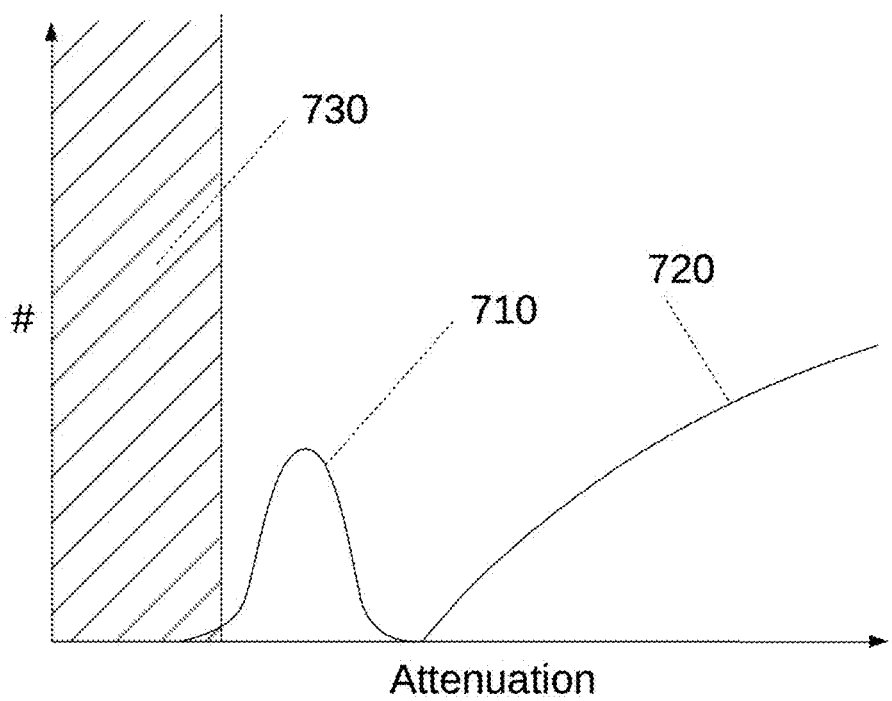
FIG. 7 is a histogram showing measured attenuation of light beams from two objects applied to the touch surface, a stylus and a finger.
Figure 8:
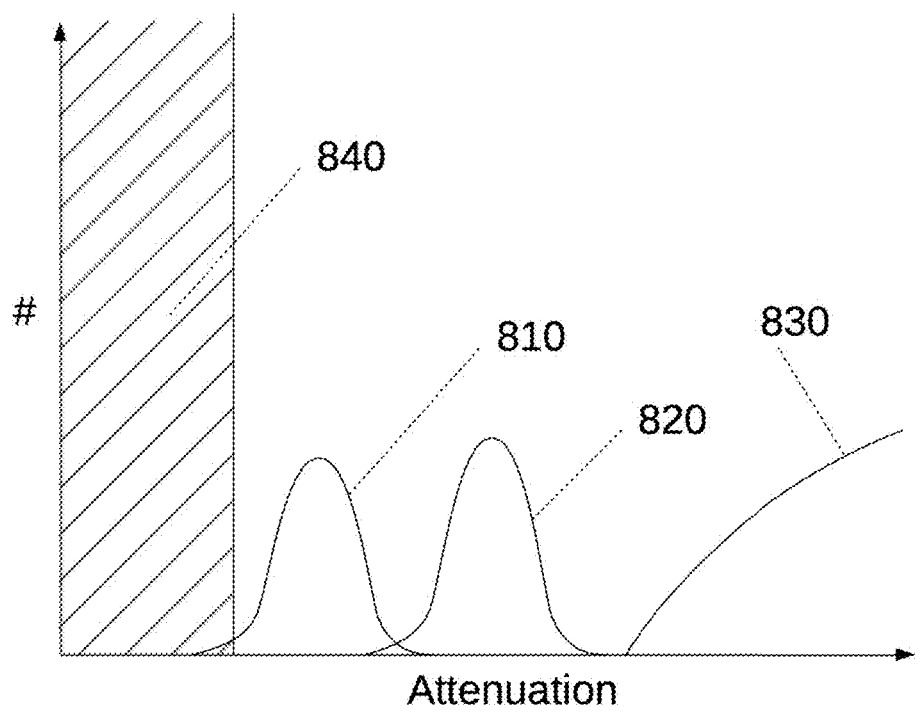
FIG. 8 is a histogram showing measured attenuation of light beams from three objects applied to the touch surface, a first stylus, a second stylus, and a finger.
Figure 9:
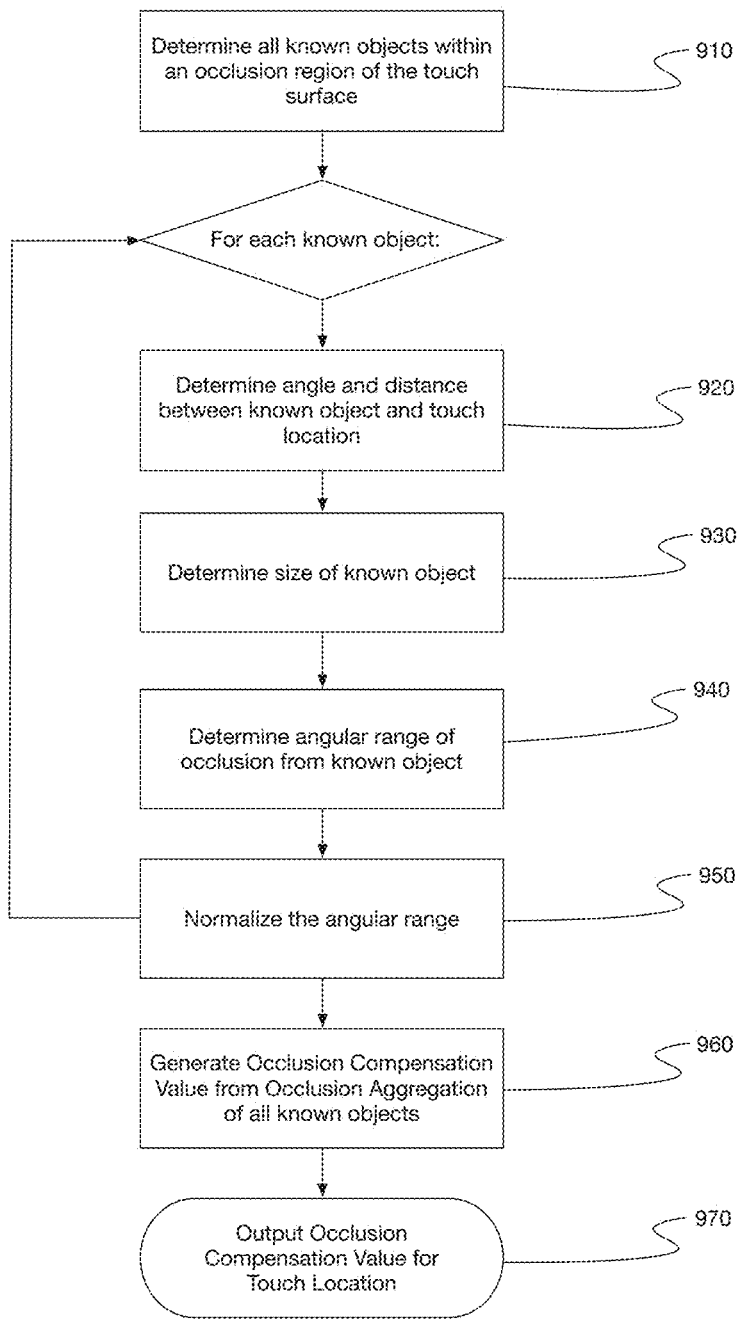
FIG. 9 is flow chart showing the process for determining an occlusion compensation value for a touching object.

Certain objects may provide a wider distribution of attenuation values than others. FIG. 7 is a histogram showing measured attenuation of light beams from two objects applied to the touch surface, a stylus and a finger. Bell-shaped distribution of values 710 represents attenuation values for a specially designed stylus tip applied to the touch surface. Distribution 720 represents attenuation values for a population of different fingers applied to the touch surface. As people have different sized fingers and some fingers may be more oily that others, the range of possible attenuation values from objects in distribution 720 is much wider than the possible attenuation values for a specially designed stylus tip. Zone 730 represents attenuation values which are too small for the system to reliably record. In a typical example, zone 730 covers attenuation values smaller than $1.8*10^{-3}$ (Note: All attenuation values described in the present specification have units of $mm^{-1}$ but it is understood that attenuation may be measured in a number of different ways.) Depending on the touch resolution of the system, this may translate to objects smaller than 0.5 mm. Therefore, an embodiment of the disclosure includes a stylus tip configured to provide attenuation values in a range greater than values in zone 730 but smaller than the range of attenuation values occupied by distribution 720. E.g. $1.8*10^{-3}$<stylus tip attenuation<$2.0*10^{-2}$ FIG. 8 is a histogram showing measured attenuation of light beams from three objects applied to the touch surface, a first stylus, a second stylus, and a finger. As in FIG. 7, bell-shaped distribution of values 810 represents attenuation values for a first specially designed stylus tip applied to the touch surface. Distribution 830 represents attenuation values for a finger applied to the touch surface. Zone 840 represents attenuation values which are too small for the system to reliably record. Bell-shaped distribution of values 820 represents attenuation values for a second specially designed stylus tip applied to the touch surface. Therefore, another embodiment of the disclosure includes a first stylus tip configured to provide attenuation values in a range greater than values in zone 840 but smaller than the range of attenuation values 820 occupied by a second stylus tip. The second stylus tip is configured to provide attenuation values in a range greater than values occupied by distribution 810 but smaller than the range of attenuation values occupied by distribution 830. E.g. $1.8*10^{-3}$<first stylus tip attenuation<$7.2*10^{-3}$<second stylus tip attenuation<$2.0*10^{-2}$ In step 542 of FIG. 5a, the signal processor 130 determines an occlusion compensation value of the object at each touch location. FIG. 9 shows a flow diagram for determining the occlusion compensation value for each touch location according to an embodiment.

In step 910, signal processor 130 determines all known objects within an occlusion region of the touch surface. A known object is typically a touch location identified in the present or a previous frame. In an embodiment, the occlusion region of the touch surface is determined by a radius around the touch location. The determination of known objects within a radius of the touch location may be determined by measuring the distance between the coordinates of the touch location and the coordinates of the respective known object. If the distance is less than the value used to determine the radius, the known object is determined to be within the occlusion region.

In some embodiments, the occlusion region is the entire touch surface. In other embodiments, the occlusion region may be limited to a predefined cell of a plurality of cells covering the touch surface, wherein a cell is a portion of the touch surface. In this embodiment, the occlusion region may be limited to the cell occupied by the touch location.

Steps 920-940 may be executed for each known object in the occlusion region.

Figure 10A:
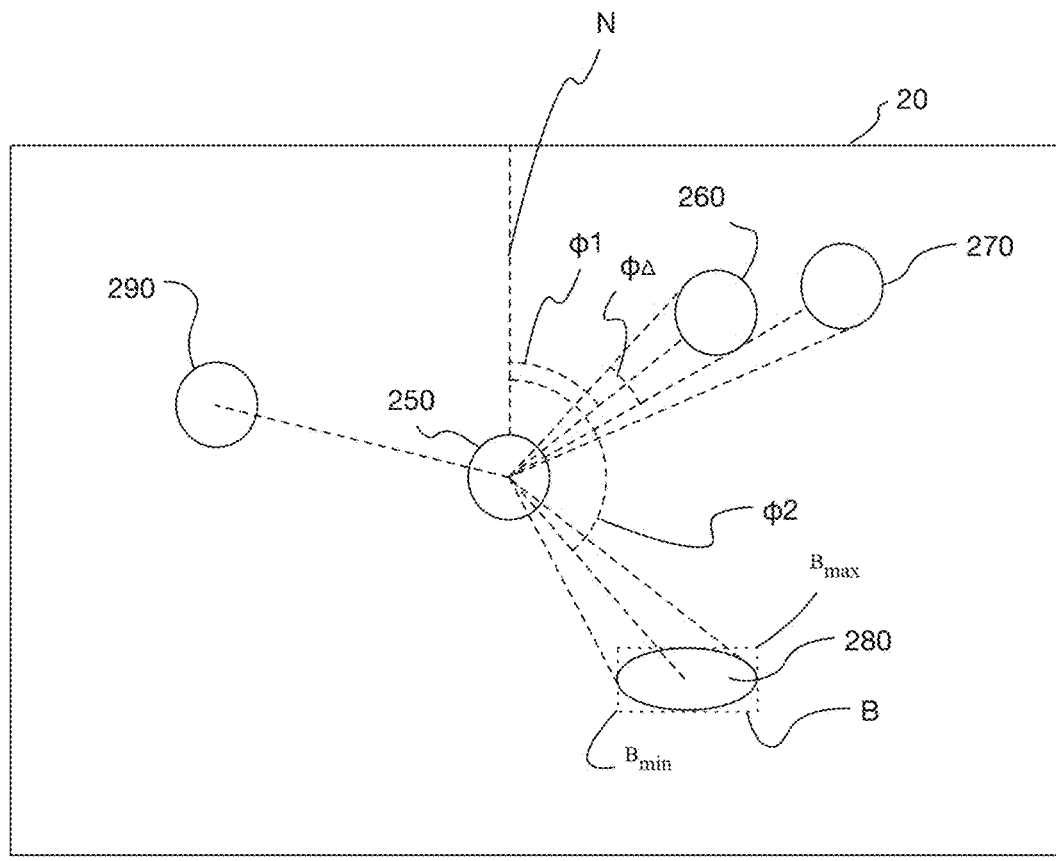
FIG. 10a is diagram showing an example of occluding objects on a touch surface.

FIG. 10a shows an example set of objects 250, 260, 270, 280, and 290 in contact with an example touch surface.

Figure 10B:
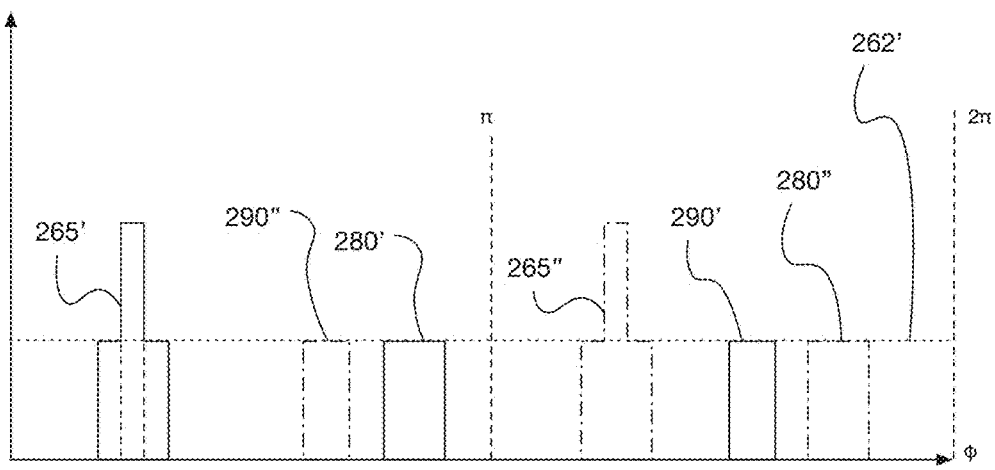
FIG. 10b shows the occluded angle ranges of a touching object.
Figure 11:
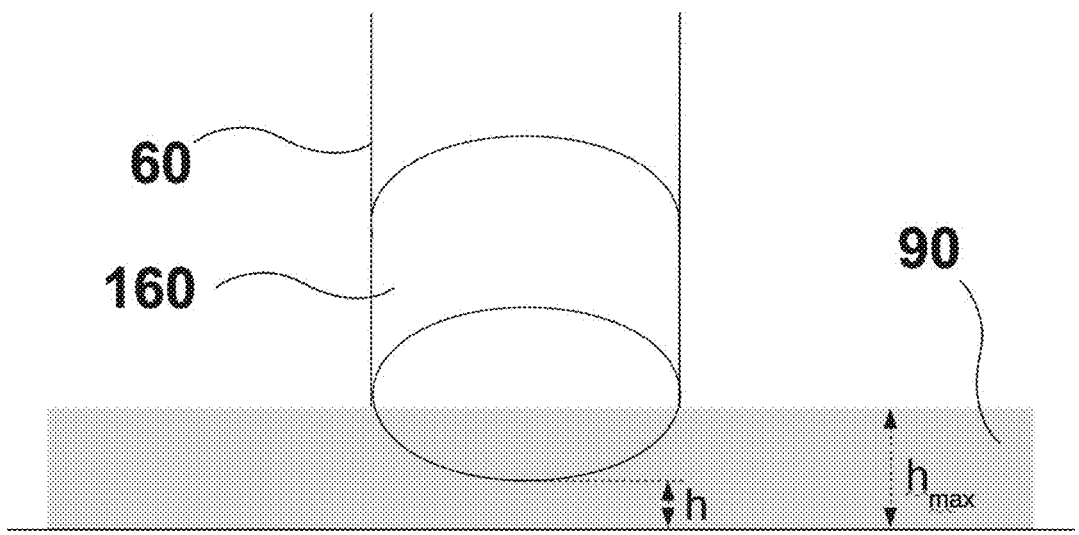
FIG. 11 shows an object entering a light field.
Figure 12:
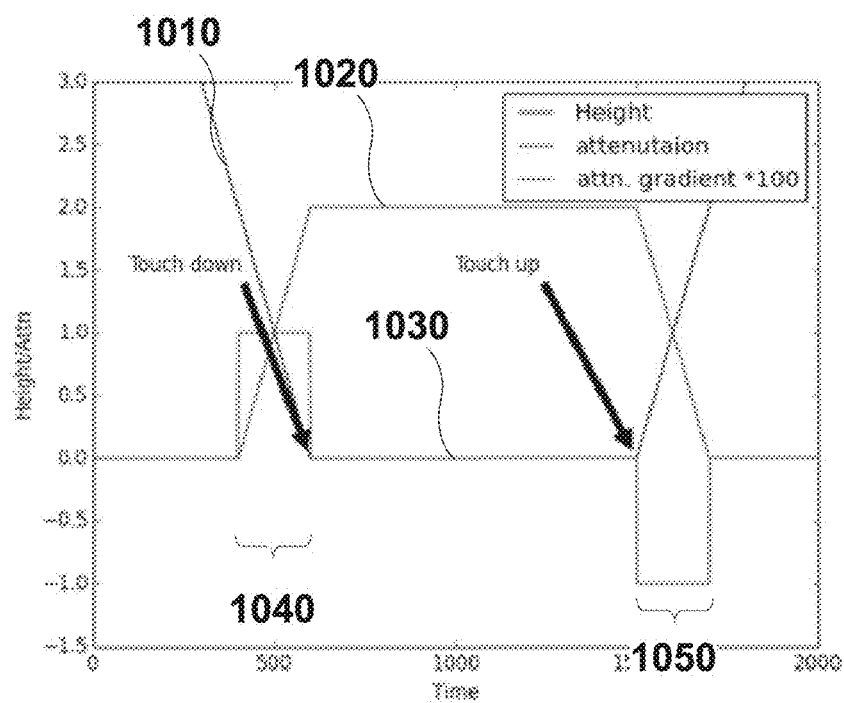
FIG. 12 shows an attenuation value of an object during a 'touch down' and a 'touch up' event.

FIG. 10b shows the occlusion of light at touch location 250 on the touch surface with respect to angle φ resulting from occluding objects 260, 270, 280, and 290. Occlusion shadow 265' shows the shadow resulting from objects 260 and 270. Although the figure shows the accumulated occlusion where the objects overlap, occlusion level 262 shows the maximum occlusion used to determine occlusion of an object. This is a natural result of the fact that light cannot typically be occluded more than once by opaque objects. Occlusion shadow 280' shows the shadow resulting from larger object 280. Occlusion shadow 290' shows the shadow resulting from object 290. Occlusion shadows 265", 280", and 290" are the corresponding occlusion shadows resulting from detection lines that must be treated as occluded as they also pass through the position of the respective occluding object, but from the far side of touch location 250.

In step 920, the angle φ1 between axis N and the vector between the first respective known object 260 and the touch location 250 is determined. In an embodiment, the centroid of the area of interaction between the object and the touch surface is used to determine co-ordinates of touching objects. In an embodiment, the angle may be calculated using the co-ordinates of the known object 260 and touch location 250 and ordinary Euclidean geometry.

In step 930, the size of the first respective known object 260 is determined. In one embodiment, an estimated size of the first known object 260 may already be known by the touch determination system or may be determined as a function of the reconstruction image generated by the signal processor 130, e.g. in dependence on the portion of the reconstruction image occupied by the first known object 260. For the purposes of the present embodiment, the size of an object is the diameter of the object in the plane of the touch surface as viewed from the touch location 250. i.e. The width of the silhouette of the known object as viewed from the touch location 250. Where first known object 260 is substantially circular, this diameter may be largely consistent regardless of the angle between the touch location 250 and first known object 260. Where first known object 260 is irregular, the diameter of the object in the plane of the touch surface as viewed from the touch location 250 may vary considerably in dependence on the orientation of first known object 260 and/or the angle between the touch location 250 and first known object 260. For smaller objects, this variation may be ignored, but for larger objects (e.g. a rectangular board eraser), the variation in the diameter of the large object as viewed from the touch location 250 may be as much as three times larger from one angle than from another. In one embodiment, the size of an object is determined as a function of the width, length, and azimuth of the object, wherein the length of the object is defined as the major axis of the object, the length of the object is defined as the minor axis of the object, and wherein the azimuth is the angle between the major axis of the object and axis N.

In an embodiment, the length, width, and azimuth are used to determine a rectangular bounding box B around the shape of the known object. The length, width of the known object defines the length and width of bounding box B, and the azimuth defines the rotation of bounding box B. The co-ordinate of the four corners of the bounding box are then determined and the two co-ordinates defining the minimum ($B_{min}$) and maximum angle ($B_{max}$) to the touch location 250 with respect to axis N are used to determine the diameter of the object in the plane of the touch surface as viewed from the touch location 250, and therefore the size of the object.

In step 940, the angular range over which the light reaching touch location 250 is occluded by first known object 260 is calculated. In an embodiment, the angular range $\varphi\Delta$ is determined to be:

$$\varphi\Delta = 2 * \tan^{-1} (size/(2*distance\ between\ objects))$$

In an embodiment, where the ratio between the known object size and the distance between the known object and the touch location is larger than a threshold, angular range $\varphi\Delta$ is determined to be:

$$\varphi\Delta = size/distance\ between\ objects$$

In one embodiment, the threshold is between 0.15 and 0.5. In an embodiment, the above threshold is 0.3.

In step 950, the angular range for all known objects is aggregated to determine the full occlusion for all the known objects. In an embodiment, the angular range for each of the known objects is summed to generate a summed angular range. For overlapping angular ranges (e.g. occlusion shadow 265 of FIG. 10b), the overlapping portion is used only once for the generation of the summed angular range. i.e. The determined occlusion has a maximum of occlusion maximum 262. This is to ensure that the occlusion compensation value is not distorted by angular ranges where light has already been occluded once.

In step 960, the summed angular range is normalised to generate an occlusion ratio. In one example, the summed angular range is normalised by dividing the summed angular range by pi radians or 180 degrees, depending on the angular units used to determine the summed angular range. The need for this normalisation step is shown in FIG. 10b, where occlusion shadows 265", 280", and 290" must also compensated for. In an alternative embodiment, the step of normalization is performed as part of step 940 for each angular range $\varphi\Delta$.

In step 970, an occlusion compensation value for the touch location is generated in dependence on the occlusion ratio. Because the attenuation of an object at touch location 250 will decrease in dependence on the occlusion ratio, it is useful to use this occlusion ratio to generate the occlusion compensation value. As the detection lines occluded by other objects cannot be used to determine the attenuation caused by the object at touch location 250, the measured attenuation is reduced in proportion to the number of occluded detection lines. Consequently, the measured attenuation can be compensated using the occlusion ratio. In an embodiment, the compensated attenuation value is equal to the occlusion ratio.

In an alternative embodiment, the occlusion compensation value is generated in dependence on the number of known objects present on the touch surface alone.

In another alternative embodiment, the occlusion compensation value is generated just in dependence on the number of known objects present on the touch surface within a selected distance of the object.

In step 548 of FIG. 5a, the signal processor 130 determines a compensated attenuation value of the object at each touch location in dependence on the attenuation value and the occlusion compensation value. In an embodiment, the compensated attenuation value is determined by dividing the attenuation value determined in step 540 by the occlusion compensation value determined in step 542/970.

In an embodiment, signal processor 130 is configured to store a plurality of object IDs in memory, each object ID having an associated attenuation value range. In the following example, three object types with associated Object IDs are shown.

| Object ID: | 001 | 002 | 003 |
|---|---|---|---|
| Object type: | Stylus Thick | Stylus Thin | Finger |
| Output type: | Think Blue Ink | Thick Red Ink | Thick Black Ink |
| Attenuation Max: | $2.0 * 10^{-2}$ | $7.2 * 10^{-3}$ | |
| Attenuation Min: | $7.2 * 10^{-3}$ | $1.8 * 10^{-3}$ | $2.0 * 10^{-2}$ |

In an embodiment, each Object ID has an attenuation value range, defined by an Attenuation Max value and an Attenuation Min value. The Object IDs may optionally include further values defining properties of an associated object, including a recognised object type, an output type (e.g. a brush type, ink colour, selection type, etc.)

In step 550, signal processor 130 matches each touch location to an Object ID. This is done by matching the compensated attenuation value of each touch location to the range of the matching Object ID. i.e. A touch location with an attenuation value of $1.2*10^{-2}$ will be matched to Object ID 001. In one embodiment, an Object ID exists with a range for all values above a specific value. This allows all objects with a compensated attenuation value above the usual ranges of the Object IDs to be identified using the same 'default large object' Object ID. Similarly, in one embodiment, an Object ID exists with a range for all values below a specific value allowing very low compensated attenuation value objects to be identified with a generic 'default small object' Object ID.

In step 560, signal processor 130 outputs the touch data, including the touch locations and corresponding Object IDs for each location.

In an alternative embodiment to that shown in FIG. 5a, the attenuation compensation value determined in step 540 is applied to the Attenuation Max value and an Attenuation Min value of the respective Object IDs, instead of directly to the attenuation value of the touch location. In an example of this embodiment, each of the Attenuation Max value and an Attenuation Min value of an Object ID is multiplied by the Attenuation Value to determine a Compensated Attenuation Max value and Compensated Attenuation Min value for the Object ID. The attenuation value is then compared against the Compensated Attenuation Max value and Compensated Attenuation Min value to determine the matching Object ID.

When matching an attenuation value of a touch to an object ID, it is important to use a stable attenuation value which correctly reflects the attenuation of the light caused by the object once it is in contact with the surface. In an 'above surface' system such as the embodiment shown in FIG. 2, light field 90 has a depth and so the object must travel a distance through the light field before contacting the touch surface. Consequently, a period of time between when the object enters the light field and when the object contacts the touch surface exists when the attenuation caused by the object is likely to be increasing. Any attenuation values measured during this period will likely not accurately reflect the light attenuation of the object once it is contacting the touch surface. In one embodiment of the disclosure, step 540 is delayed until an attenuation value of an object is determined to be stable. In one embodiment, the attenuation value of an object is determined to be stable once it has not changed greater than 10% each frame for at least three frames.

Figure 13:
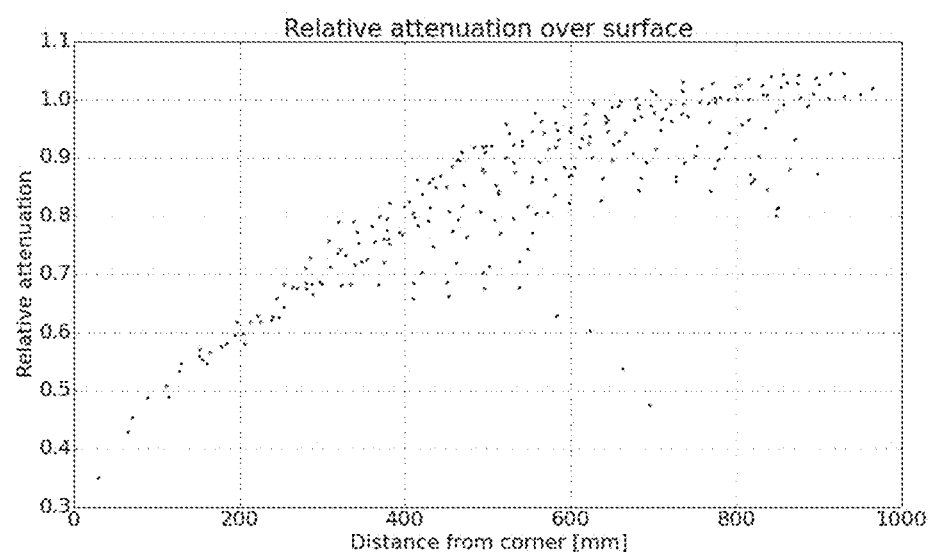
FIG. 13 is a graph showing measured attenuation of light beams by an object in proportion to the object's distance from a corner of the touch surface.

As an object is lowered into the light field, it occludes increasingly more light. As a consequence, the attenuation of light caused by the object increases until the object has hit the touch surface. The gradient of attenuation (i.e. the rate of change of the attenuation) is therefore positive as the object travels towards the touch surface until it flattens out when the object is in contact with the surface. FIG. 13 shows an object 60 with tip 160 having traveled into light field 90 for a distance of $h_{max}$-h. FIG. 13 shows an attenuation value 1020 of an object during a 'touch down' event 1040 (i.e the application of a touching object to the touch surface) and a 'touch up' event 1050 (i.e lifting the touching object off and away from the touch surface). A corresponding height h (shown as line 1010) of the object from the touch surface is also shown. The line 1030 showing the attenuation gradient (i.e. the rate of change of change of the attenuation value with respect to time) shows a typical attenuation gradient signature for both touch down and touch up events. An attenuation gradient signature is the shape of the attenuation gradient values during a touch down or touch up event.

Therefore, in an embodiment of the disclosure, signal processor 130 is configured to determine that an object attenuation value is stable and/or that a touch down event has occurred in dependence on an attenuation gradient signature (shown at time 1040 in FIG. 13) of an event. In an embodiment, the attenuation gradient signature corresponding to a touch down event is a first period of a first attenuation gradient, a second period of higher attenuation gradient, and a third period of attenuation gradient lower than the second period.

In one embodiment, a touch down event determined to have occurred once object attenuation value has exceeded a first attenuation value threshold. However, a determination that a touch down event has occurred is possible before this threshold is met, using the above method. Where the object attenuation value is below the first attenuation value threshold but an attenuation gradient signature is observed having a higher attenuation gradient equal to or greater than 20% of the first attenuation value threshold over a single frame, the object attenuation value may be determined to be stable and/or that a touch down event has occurred.

During a 'touch up' event, an attenuation value of the object decreases as the object is lifted out of the light field. Similarly to the above, the attenuation gradient signature of this event (shown at time 1050 in FIG. 13) can be recognized and actioned accordingly. Therefore, in an embodiment of the disclosure, signal processor 130 is configured to determine that an object attenuation value is reduced to zero and/or that a touch up event has occurred in dependence on an attenuation gradient signature of an event. In an embodiment, the attenuation gradient signature corresponding to a touch up event is a first period of a first attenuation gradient, a second period of negative attenuation gradient, and a third period of attenuation corresponding to the first attenuation gradient.

In one embodiment, a touch up event is determined to have occurred once the object attenuation value is determined to have dropped below a second attenuation value threshold. However, a determination that a touch up event has occurred is possible before this threshold is met, using the above method. Where the object attenuation value is above the second attenuation value threshold but an attenuation gradient signature is observed having a negative attenuation gradient equal to or greater than 20% of the second attenuation value threshold over a single frame, a touch up event may be determined to have occurred.

In an embodiment, the attenuation gradient values required to trigger touch up/down events for an object may be scaled in dependence on the presence of other occluding objects in close proximity to the object. In an example, the attenuation gradient of the second period of a signature is scaled up to require an even larger value to trigger a touch down event for an object in close proximity to other occluding objects on the touch surface. In one embodiment, the higher attenuation gradient is scaled linearly occurred to the number of additional touches within a radius of up to 10 cm. The radius may be chosen in dependence on the screen size, touch resolution, and environmental noise.

'Hooks' are a problem observed in the flow of co-ordinates of user touch input over time when the user is providing rapidly changing touch input. E.g. When drawing or writing. An example of a 'hook' is where the user finishes drawing a stroke, lifts the touch object from the surface of the panel and rapidly changes the direction of movement of the touching object to begin drawing the next stroke. The 'hook' is a small artifact seen at the end of the stroke pointing in the new direction of the user's touch object. A method of minimizing hooks is proposed. In an embodiment of the disclosure, once a negative attenuation gradient has been observed, the touch coordinates will not be updated with the object's position and the coordinates of the object's position are stored. If the object attenuation value drops below a threshold value, the stored coordinates are discarded and a 'touch up' event is signaled. If the object attenuation value does not drop below a threshold value and a positive attenuation gradient is subsequently observed, the stored touch coordinates for the intervening period will be output and the touch coordinates will continue to be output as before. In an embodiment, the method is only used when the direction of movement of the object contacting the touch surface in the plane of the touch surface is changing. In this embodiment, a vector α from a last touch coordinate of the object to a current coordinate is determined. A second vector β from a touch coordinate previous to the last coordinate to the last coordinate is determined. Vectors α and β allow a determination of the direction the interaction is moving and how it is changing. A rapid change of direction of the object may result in α scalarproduct β<0. In one embodiment, if this condition is met, it may be determined that the direction of movement of the object contacting the touch surface has significantly changed and the above method for minimizing hooks is then applied.

Although the attenuation value of an object provides information regarding the light attenuated by the object touching the surface, some embodiments of the disclosure require that the attenuation value be compensated in order to provide a true reflection of the nature and/or position of the object.

Figure 5B:
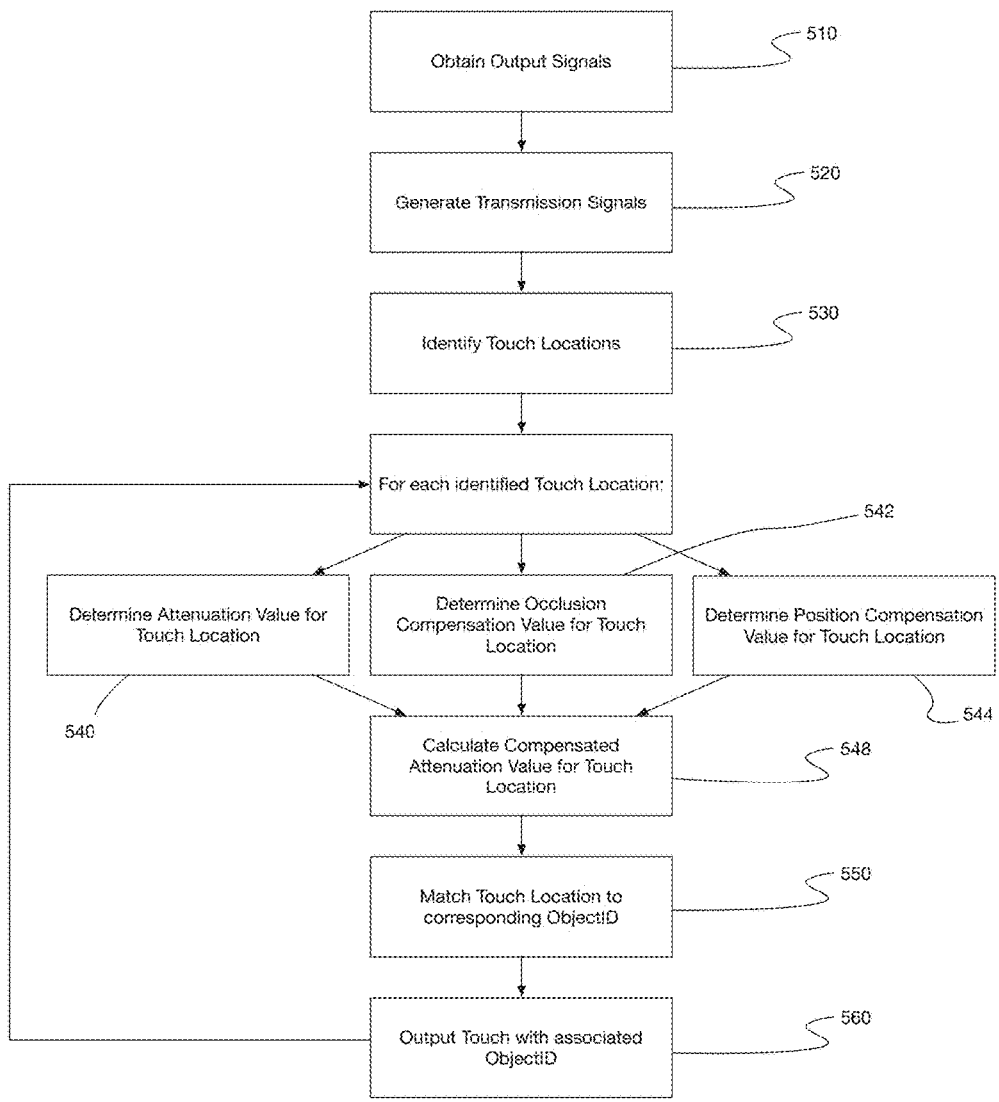
FIG. 5b is a flow chart showing a touch determination process using position compensation.

In one embodiment of the disclosure shown in FIG. 5b, the compensated attenuation value of an object is determined in dependence on the attenuation value of the object determined in step 540, an occlusion compensation value determined in step 542, and a position compensation value determined in step 544.

In certain arrangements of the system shown FIG. 1, certain positions on the touch surface are likely to result in lower attenuation values than others for equivalent objects. In particular, attenuation values towards the edge of the screen are likely to be lower than in the centre. A variety of factors may cause this to be the case. One is that efficient implementations of certain tomographic reconstruction algorithms make approximations resulting in lower reconstructed attenuation values towards the edges of the panel. In one example, attenuation values in a corner of a panel may be as low as 30% of attenuation values located at the centre of the panel for an equivalent object. FIG. 13 shows a graph of attenuation values (shown as relative attenuation) of an object touching a rectangular touch surface relative to the distance of the object from a corner of the touch surface. Consequently, an embodiment of the disclosure provides that the position compensation value is a function of at least the position of the object on the touch surface. In one embodiment, the position compensation value is determined as a function of the distance from a central point on the touch surface to the touch position. Alternatively, the compensation value may be determined as a function of the distance from the nearest corner of the touch surface to the touch position.

Figure 14:
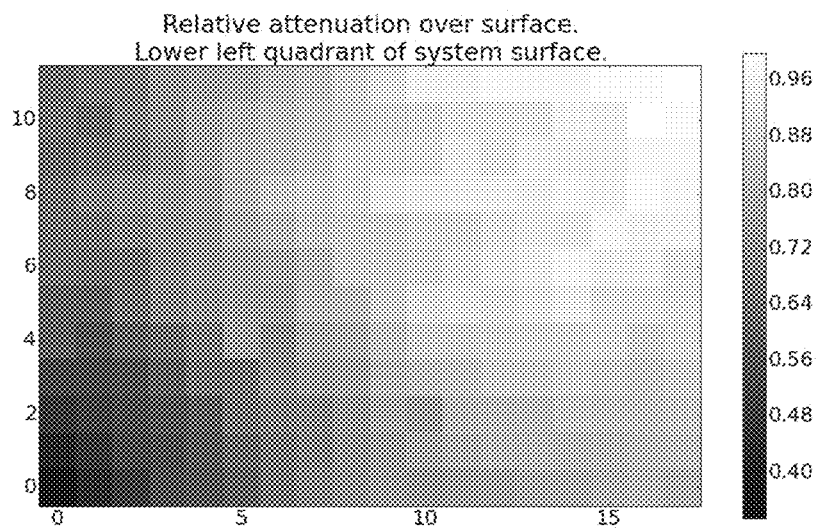
FIG. 14 is an attenuation map showing the relative attenuation of an object at each location on a corner portion of the touch surface.

The relationship between the position of the touch and a required position compensation value may be a complex function of the geometry of the emitters and detectors. FIG. 14 shows a heat map of a corner of a rectangular touch surface showing relative attenuation of a touching object. When touching at co-ordinate (0,0), the object generates relatively little attenuation. When touching at co-ordinate (10,15), a much larger amount of attenuation occurs.

Consequently, an embodiment of the disclosure provides calculating a position compensation value as a function of the position of the corresponding touch on the touch surface. An alternative embodiment describes using a compensation map to determine a position compensation value given a position on the touch surface. The compensation map may include a 2D image corresponding to the dimensions of the touch surface with pixel values corresponding to position compensation values. A touch position is then used to determine the corresponding pixel on the compensation map and the pixel value at that position provides the corresponding position compensation value. In an embodiment, the compensation map has a resolution lower than or equal to the touch resolution of the touch determination system. The compensation map is preferably generated in advance but may also be generated dynamically as a function of environmental and performance variables. In one embodiment, the compensation map is generated manually or using a calibration robot during the manufacturing phase.

Figure 5C:
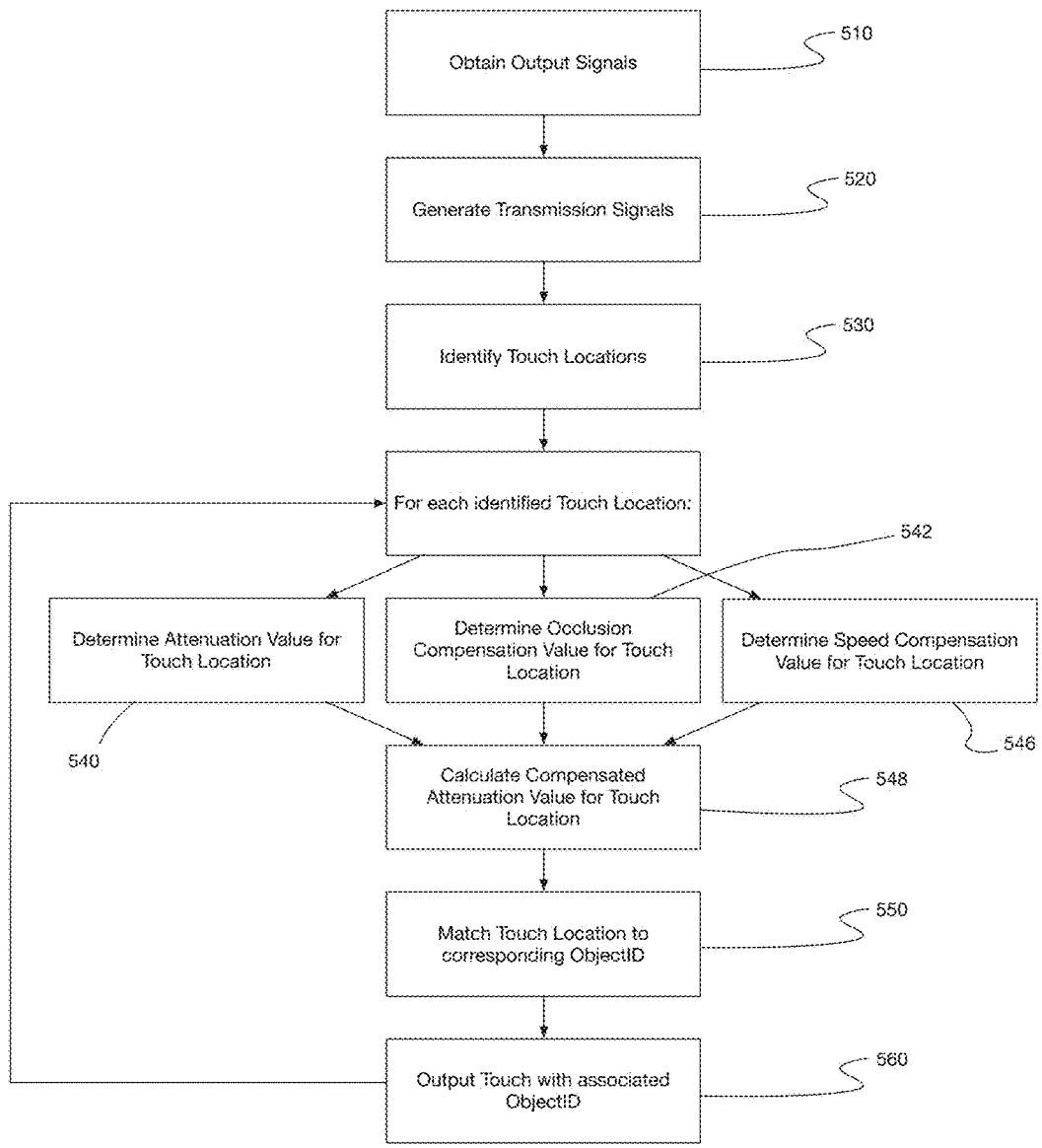
FIG. 5c is a flow chart showing a touch determination process using speed compensation.
Figure 15:
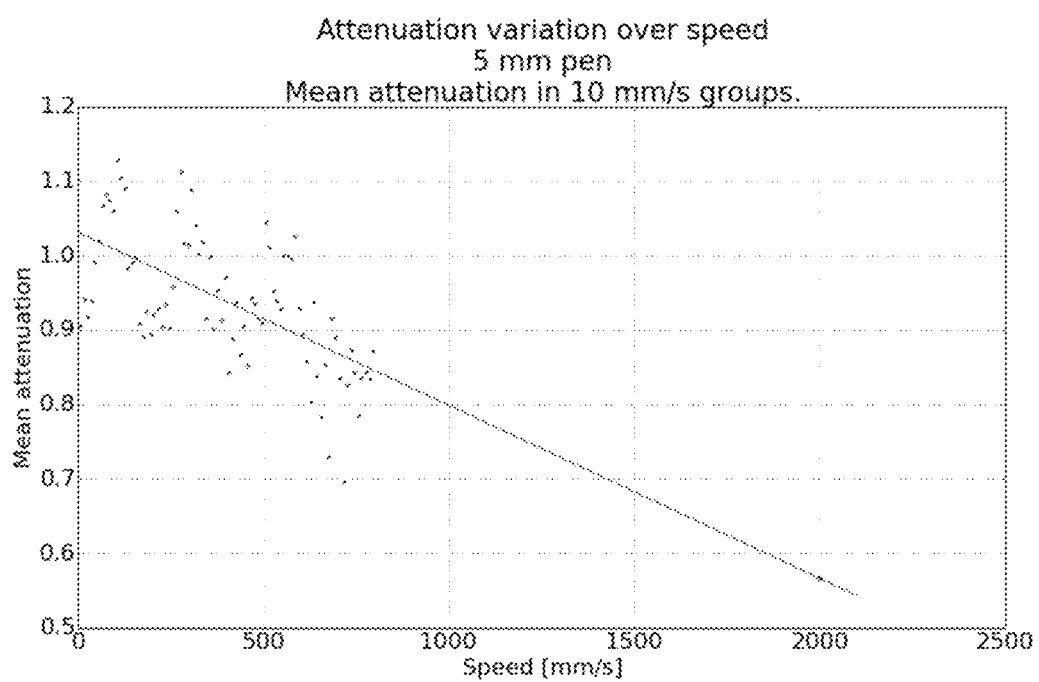
FIG. 15 is a graph showing measured attenuation of light beams by an object in proportion to speed at which the object is moving across the touch surface.

Another variable which may affect the recorded attenuation of a touch object is the speed at which the touching object is moving across the touch surface. The light attenuation of each light path is recorded sequentially over a series of frames. Therefore, a sufficiently fast moving object may have moved away from a specific position before the attenuation of all light paths intersecting the position have been measured. Consequently, a moving object may generate a weaker attenuation signal. FIG. 15 shows a graph of recorded attenuation values of an object relative to the speed of the object across the touch surface. A relationship can be seen showing that a faster moving object is likely to generate a weaker attenuation value. Therefore, in one embodiment of the disclosure shown in FIG. 5c, the compensated attenuation value of an object is determined in dependence on at least the attenuation value of the object determined in step 540, an occlusion compensation value determined in step 542, and a speed compensation value determined in step 546. As the relationship between the speed of an object and the recorded attenuation value may also be complicated by the position of the moving object on the touch surface, an embodiment of the disclosure provides determining a compensation value as a function of both the position and speed of the object on the touch surface.

What is claimed is:

1. A touch sensing apparatus, comprising:
   a touch surface,
   a plurality of emitters arranged around a periphery of the touch surface, the plurality of emitters configured to emit beams of light such that one or more objects touching the touch surface cause an attenuation of the light;
   a plurality of detectors arranged around the periphery of the touch surface, the plurality of detectors configured to receive light from the plurality of emitters on a plurality of light paths, wherein each detector in the plurality of detectors is arranged to receive light from more than one emitter in the plurality of emitters; and
   a hardware processor configured to:
   determine, based on output signals generated by the plurality of detectors, a light energy value for each light path of the plurality of light paths;
   generate a transmission value for each light path of the plurality of light paths based on the light energy value;
   from at least part of the thus-generated transmission values, determine for each object;
      a position of the object on the touch surface, and
      an attenuation value corresponding to the attenuation of the light resulting from the object touching the touch surface,
      an occlusion compensation value indicative of the occlusion, by other objects on the touch surface, of light paths intersecting with the object,
   determine an object type of the object in dependence on the attenuation value and occlusion compensation value.

2. The touch sensing apparatus of claim 1, wherein other objects on the touch surface are occluding objects and the occlusion compensation value is determined in dependence on the number of occluding objects.

3. The touch sensing apparatus of claim 2, wherein the occlusion compensation value is determined in dependence on the number of occluding objects within a selected distance of the object.

4. The touch sensing apparatus of claim 1, wherein the occlusion compensation value is determined as a function of the size and angle with respect to the object, of the occluding objects.

5. The touch sensing apparatus of claim 4, wherein the size an occluding object is determined as a function of a width, length, and azimuth of the occluding object.

6. The touch sensing apparatus of claim 1, wherein the image reconstruction algorithm is an algorithm for transmission tomography.

7. The touch sensing apparatus of claim 1, the processing element further configured to store a plurality of object IDs, each having an associated attenuation value range.

8. The touch sensing apparatus of claim 7, the processing element further configured to:
determine an occlusion compensated attenuation value for the object in dependence on the attenuation value and the occlusion compensation value;
identify an object ID with an attenuation value range corresponding to the occlusion compensated attenuation value of the object and associating the object ID with the object.

9. The touch sensing apparatus of claim 8, wherein the identifying step is not performed by the processing element until the attenuation value is determined to be stable.

10. The touch sensing apparatus of claim 9, wherein the attenuation value is determined to be stable when the rate of change of the attenuation value is below a predefined threshold.

11. The touch sensing apparatus of claim 9, wherein the attenuation value is determined to be stable when the rate of change of the attenuation value is determined to rise above a first threshold and then subsequently drop below a second threshold, wherein the second threshold is lower than the first threshold.

12. The touch sensing apparatus of claim 1, the attenuation value is generated in dependence on the attenuation of the light resulting from the object touching the touch surface and a compensation value.

13. The touch sensing apparatus of claim 12, wherein the compensation value is a function of at least the position of the object on the touch surface.

14. The touch sensing apparatus of claim 12, the compensation value being the value at a position on a compensation map corresponding to the position of the object on the touch surface.

15. The touch sensing apparatus of claim 12, wherein the compensation value is a function of at least the speed of the object across the touch surface.

16. The touch sensing apparatus of claim 15, wherein the compensation value is proportional to the speed of the object across the touch surface.

17. A method of determining a type of object in contact with a touch surface of a touch sensing apparatus, said touch sensing apparatus comprising:
a touch surface,
a plurality of emitters, arranged around the periphery of the touch surface, configured to emit beams of light such that one or more objects touching the touch surface cause an attenuation of the light;
a plurality of detectors, arranged around the periphery of the touch surface, configured to receive light from the plurality of emitters on a plurality of light paths, wherein each detector in the plurality of detectors is arranged to receive light from more than one emitter in the plurality of emitters; and
said method comprising the steps of:
determining, based on output signals generated by the plurality of detectors, a light energy value for each light path of the plurality of light paths;
generating a transmission value for each light path of the plurality of light paths based on the light energy value;
from at least part of the thus-generated transmission values, determine for each object;
a position of the object on the touch surface, and
an attenuation value corresponding to the attenuation of the light resulting from the object touching the touch surface,
an occlusion compensation value indicative of the occlusion, by other objects on the touch surface, of light paths intersecting with the object;
determining an object type of the object in dependence on the attenuation value and occlusion compensation value.

* * * * *